(12) United States Patent
Park et al.

(10) Patent No.: US 12,052,127 B2
(45) Date of Patent: Jul. 30, 2024

(54) METHOD AND APPARATUS FOR RECEIVING PPDU VIA BROADBAND IN WIRELESS LAN SYSTEM

(71) Applicant: LG Electronics Inc., Seoul (KR)

(72) Inventors: Eunsung Park, Seoul (KR); Jinsoo Choi, Seoul (KR); Dongguk Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 17/630,309

(22) PCT Filed: Jul. 21, 2020

(86) PCT No.: PCT/KR2020/009613
§ 371 (c)(1),
(2) Date: Jan. 26, 2022

(87) PCT Pub. No.: WO2021/033339
PCT Pub. Date: Feb. 25, 2021

(65) Prior Publication Data
US 2022/0278883 A1    Sep. 1, 2022

(30) Foreign Application Priority Data

Aug. 20, 2019  (KR) .......................... 10-2019-0101528

(51) Int. Cl.
*H04L 27/26* (2006.01)
*H04W 84/12* (2009.01)

(52) U.S. Cl.
CPC ......... *H04L 27/2621* (2013.01); *H04W 84/12* (2013.01)

(58) Field of Classification Search
None
See application file for complete search history.

(56) References Cited

U.S. PATENT DOCUMENTS

| 2014/0153507 | A1 | 6/2014 | Yang et al. |
| 2017/0126456 | A1 | 5/2017 | Lee et al. |
| 2017/0288745 | A1 | 10/2017 | Seok |
| 2019/0289612 | A1* | 9/2019 | Chen .................. H04L 27/2613 |
| 2020/0228380 | A1* | 7/2020 | Yang .................... H04L 5/0039 |

FOREIGN PATENT DOCUMENTS

| KR | 20140124842 | 10/2014 |
| WO | WO2019032216 | 2/2019 |

* cited by examiner

*Primary Examiner* — Christine T Duong
(74) *Attorney, Agent, or Firm* — Fish & Richardson P.C.

(57) ABSTRACT

Proposed are a method and apparatus for receiving PPDU in a wireless LAN system. Specifically, a receiving STA receives a PPDU from a transmitting STA via broadband and decodes the PPDU. The broadband is a 320 MHz or 160+160 MHz bandwidth that is not preamble punctured. The PPDU includes a first field and a second field. The first field includes L-LTF. The PPDU includes a first signal field and a second signal field. The first field includes L-LTF. The first field is generated on the basis of one of a first, second, third or fourth phase rotation value. The first phase rotation value is a phase rotation value that obtains PAPR of the L-LTE optimized for the broadband on the basis of a first combination of RFs used for transmitting the PPDU. The first combination of RFs is a combination of 160 MHz-capable RFs or 320 MHz-capable RFs.

17 Claims, 25 Drawing Sheets

FIG. 1
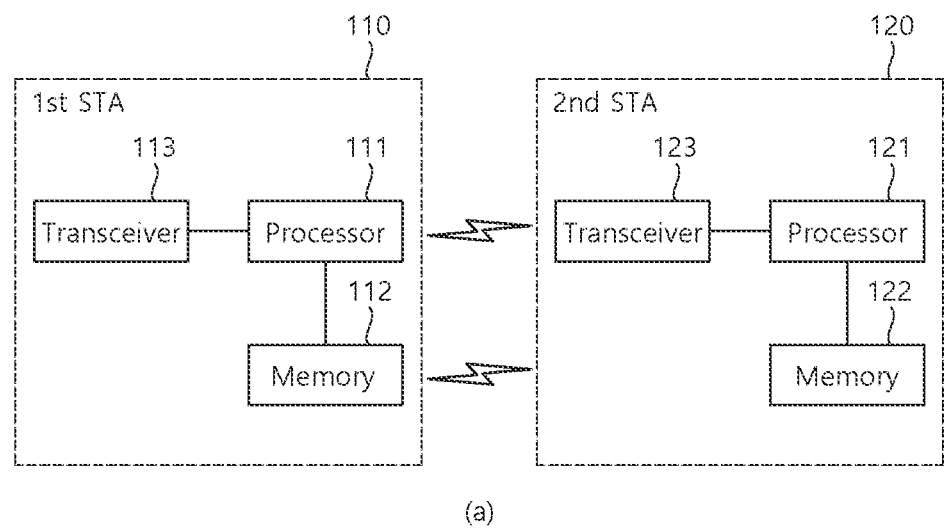
(a)
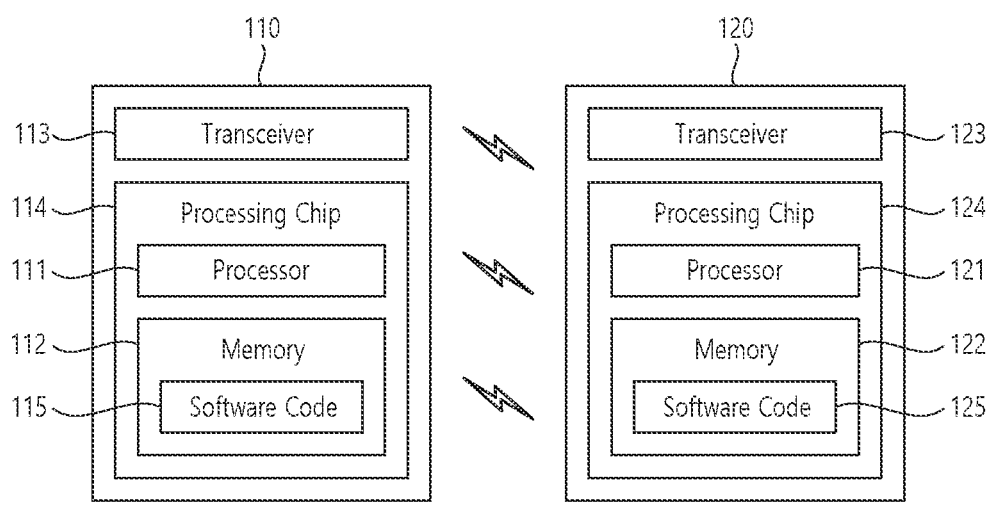
(b)

FIG. 2
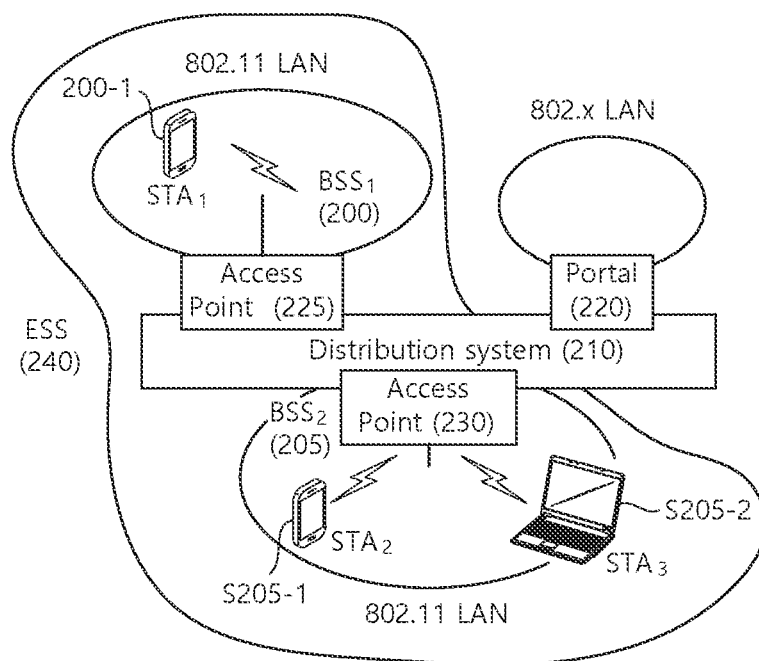
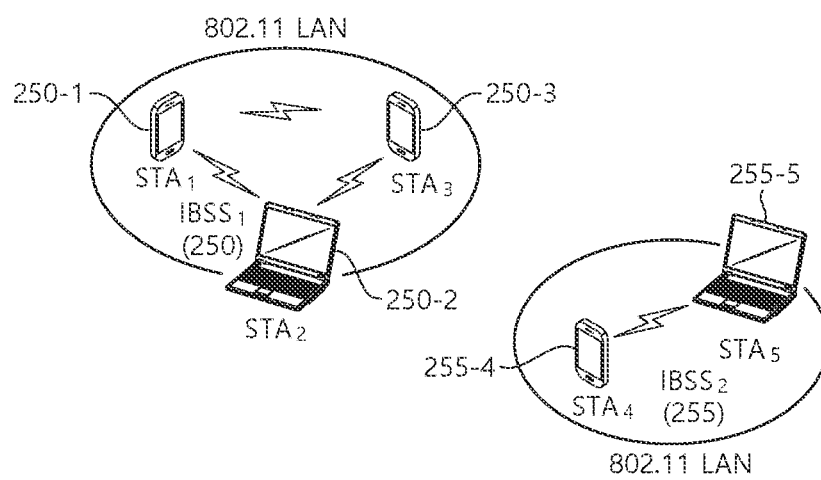

FIG. 4

| L-LTF | L-STF | L-SIG | Data |

PPDU Format (IEEE 802.11a/g)

| L-LTF | L-STF | L-SIG | SIG A | HT-SFT | HT-LFT | ... | HT-LFT | Data |

HT PPDU Format (IEEE 802.11n)

| L-LTF | L-STF | L-SIG | VHT-SIG A | VHT-SFT | VHT-LFT | VHT-SIG B | Data |

VHT PPDU Format (IEEE 802.11ac)

| 8µs | 8µs | 4µs | 4µs | 8µs | 4µs per symbol | 4µs | Variable durations per HE-LTF symbol | | |
|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

METHOD AND APPARATUS FOR RECEIVING PPDU VIA BROADBAND IN WIRELESS LAN SYSTEM

CROSS-REFERENCE TO RELATED APPLICATIONS

This application is a National Stage application under 35 U.S.C. § 371 of International Application No. PCT/KR2020/009613, filed on Jul. 21, 2020, which claims the benefit of Korean Patent Application No. 10-2019-0101528, filed on Aug. 20, 2019. The disclosures of the prior applications are incorporated by reference in their entirety.

BACKGROUND OF THE DISCLOSURE

Field of the Disclosure

The present disclosure relates to a method for receiving a PPDU through a broadband in a wireless LAN system and, more particularly, to a method and an apparatus for receiving a PPDU to which phase rotation has been applied for an optimized PAPR in a broadband for which preamble puncturing has not been performed.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present disclosure proposes a method and an apparatus for receiving a PPDU through a broadband in a wireless LAN system.

One embodiment of the present disclosure proposes a method for receiving a PPDU through a broadband.

The present embodiment proposes a method and an apparatus for setting a phase rotation value applied to a legacy preamble for an optimized PAPR of an L-STF and an L-LTF when a PPDU is transmitted over a broadband (240 MHz or 320 MHz band). However, the broadband according to the present embodiment means a full band for which preamble puncturing has not been performed, and the broadband according to the present embodiment is limited to a 320 MHz band or a 160+160 MHz band.

A receiving station (STA) receives a Physical Protocol Data Unit (PPDU) from a transmitting STA through a broadband.

The receiving STA decodes the PPDU.

The broadband is a 320 MHz band or a 160+160 MHz band without preamble puncturing.

The PPDU includes a first field and a second field. The first field includes a Legacy-Long Training Field (L-LTF). Also, the first field may further include a Legacy-Short Training Field (L-STF). The second field may include a control field and a data field that support the 802.11be wireless LAN system. In other words, the first field may be a legacy preamble, and the second field may be an EHT field.

The first field is generated based on one of a first, second, third, or fourth phase rotation values. One of the first, second, third, or fourth phase rotation values may be commonly applied to all fields included in the first field. The first, second, third, or fourth phase rotation values is defined as follows.

The first phase rotation value is a phase rotation value for obtaining the Peak-to-Average Power Ratio (PAPR) of the L-LTF optimized in the broadband based on a combination of a first Radio Frequency (RF) used when the PPDU is transmitted. The combination of the first RF is a combination of RF with 160 MHz capability or RF with 320 MHz capability. In other words, the first phase rotation value may be obtained i) in the full band for which preamble puncturing has not been performed ii) by considering 160 MHz/320 MHz capability RF iii) as a phase rotation value that minimizes the maximum PAPR of the L-LTF. Accordingly, the first phase rotation value is [1 j −1 j 1 −j 1 1 j −1 j −j −1 j −1].

Advantageous Effects

According to an embodiment of the proposed disclosure, when a PPDU is transmitted through a 240 MHz or 320 MHz band in which preamble puncturing has not been performed, a new effect of obtaining the PAPR optimized for an L-STF and an L-LTF may be achieved by defining a phase rotation value applied to a legacy preamble. Therefore, subcarrier efficiency and high throughput may be obtained.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

DESCRIPTION OF EXEMPLARY EMBODIMENTS

Figure 3:
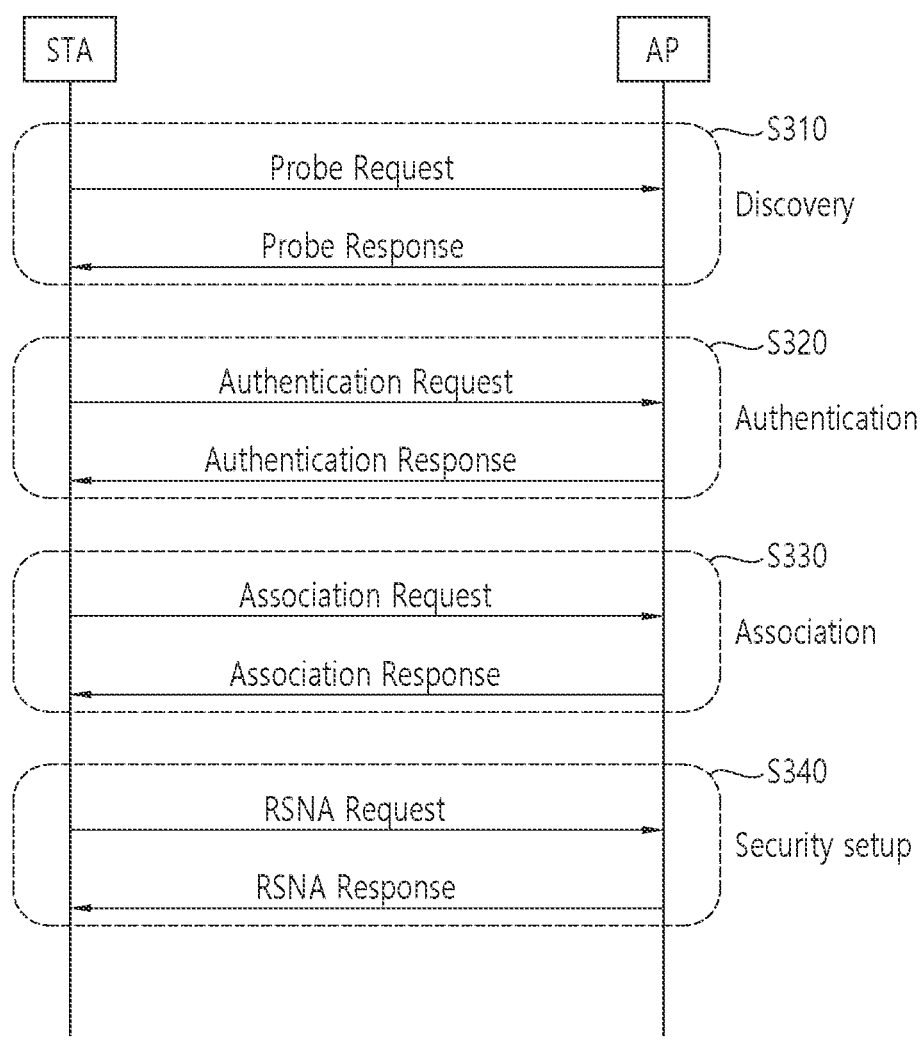
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBS S, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
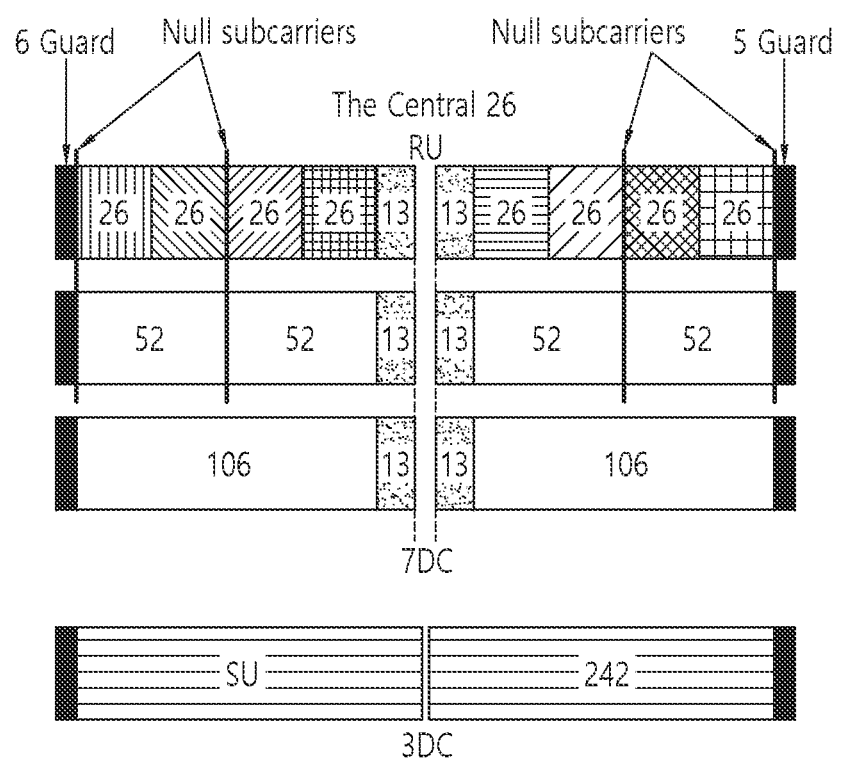
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
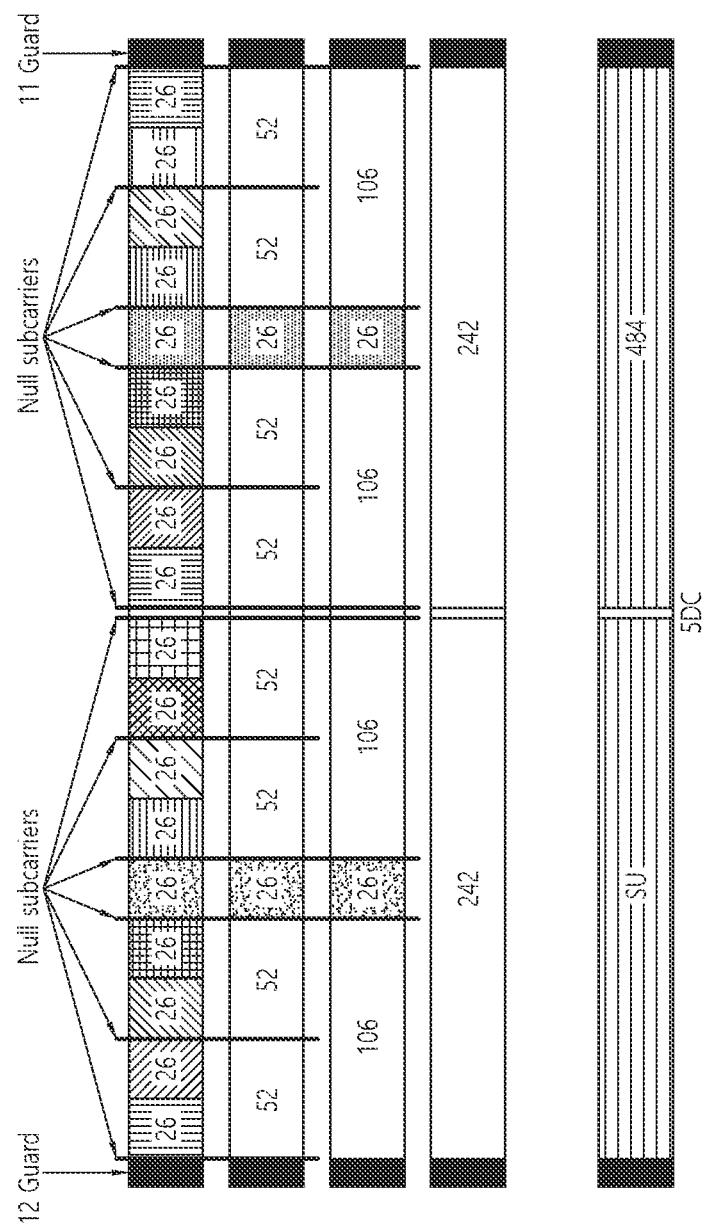
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
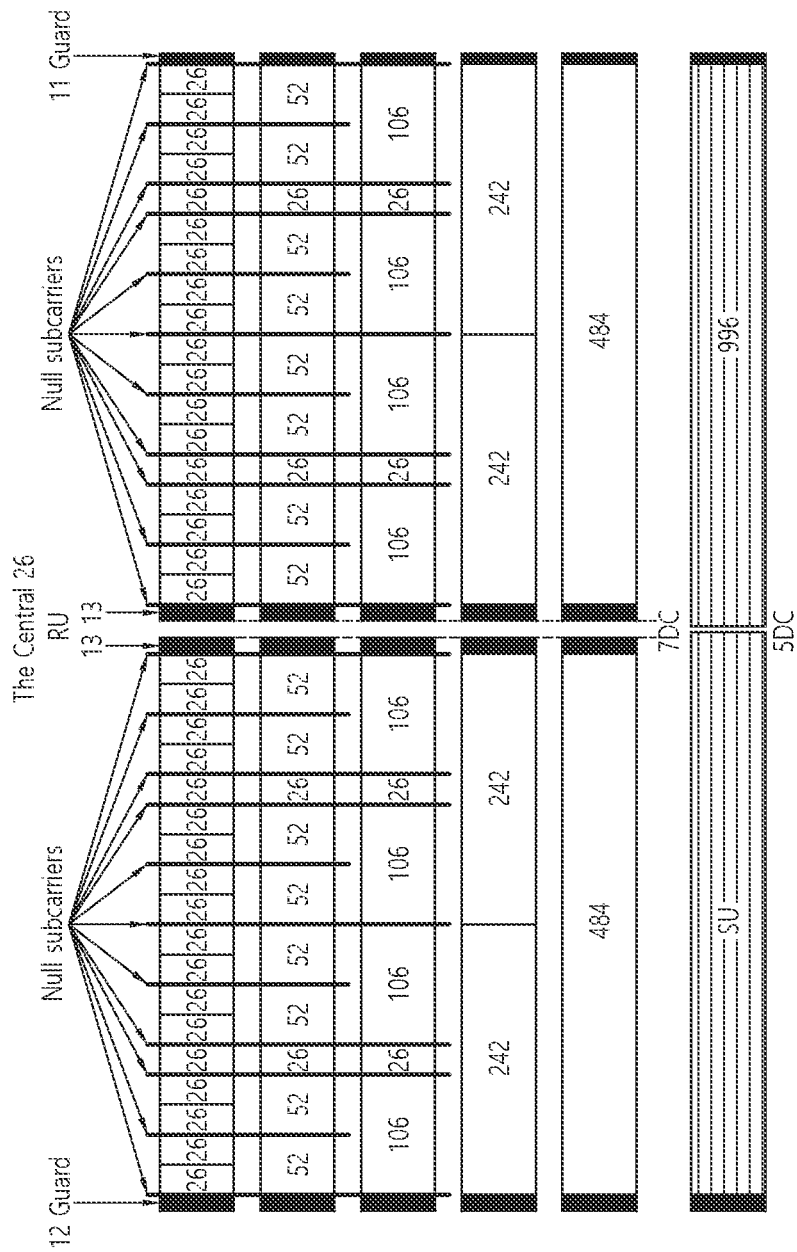
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
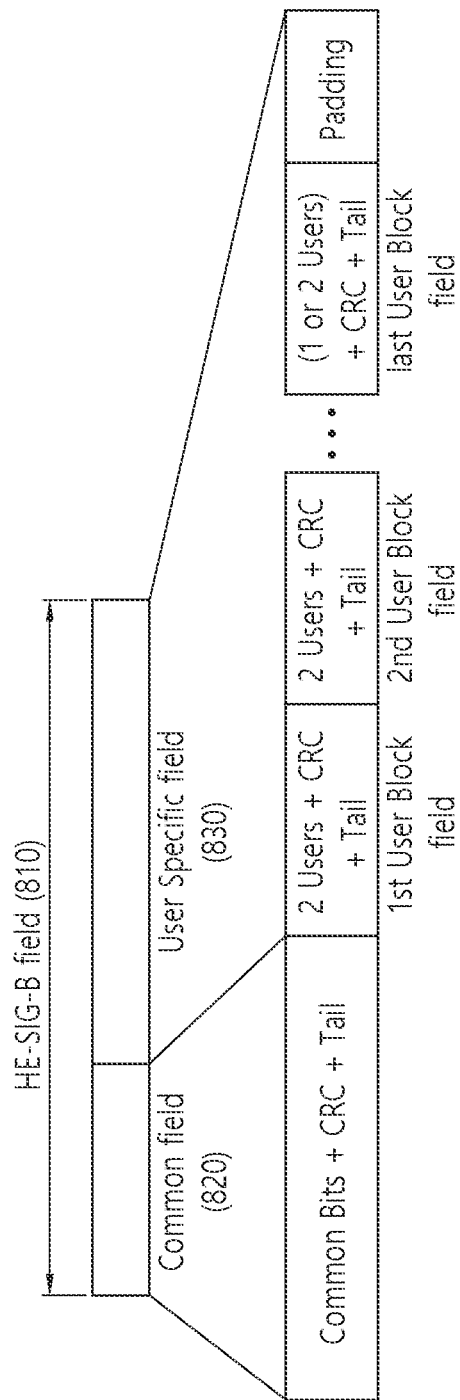
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |

TABLE 1-continued

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 1 | | | | | | 6-8 | |
|   | 1100 | 3 | 3 | 1 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
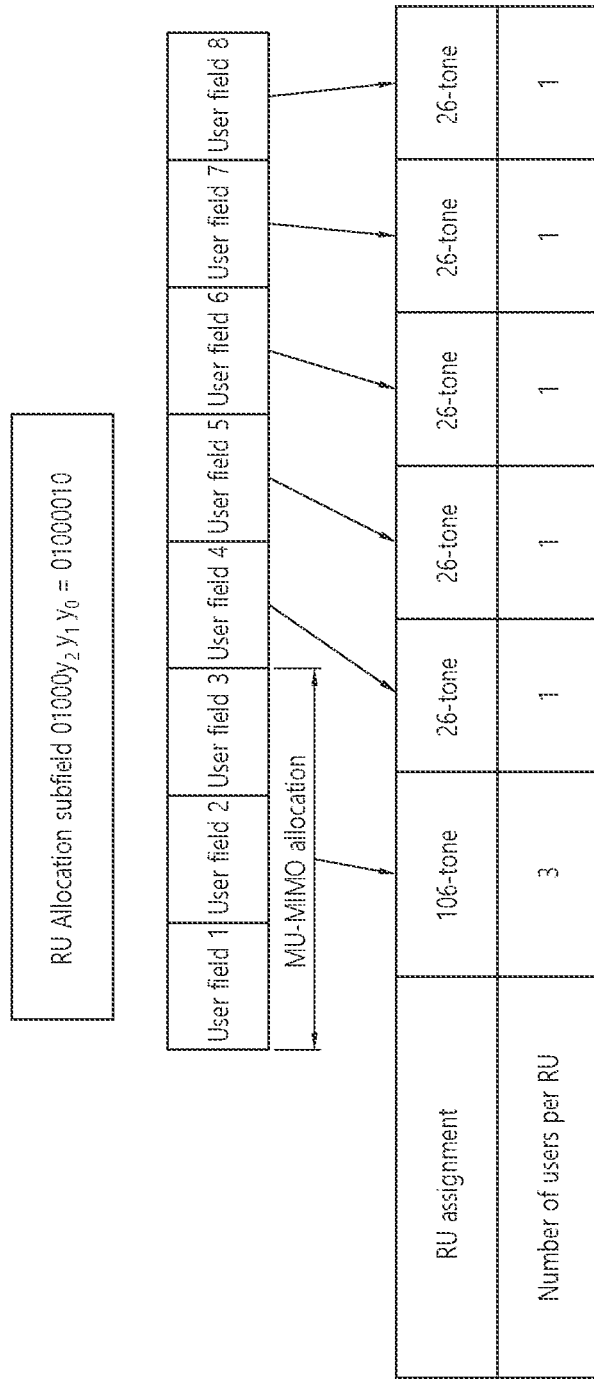
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
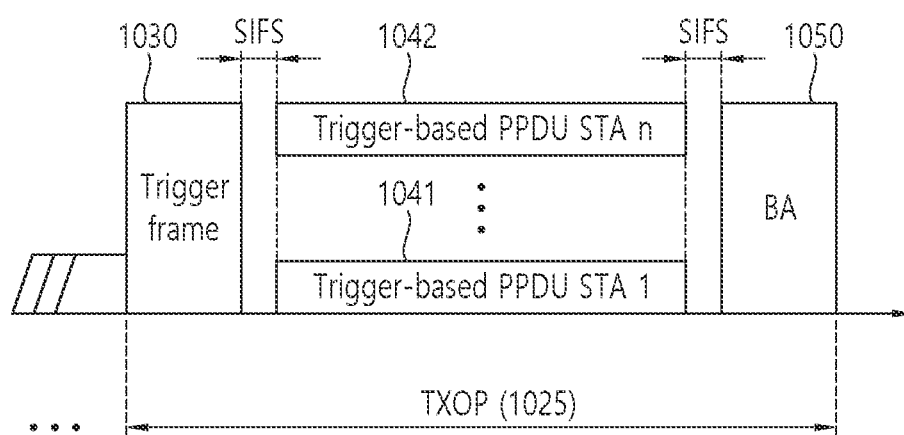
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
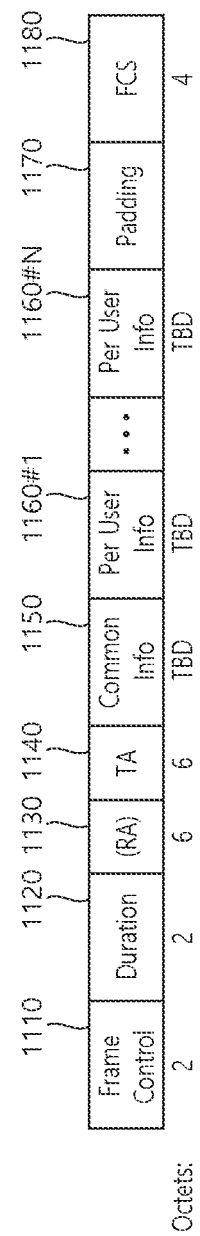
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
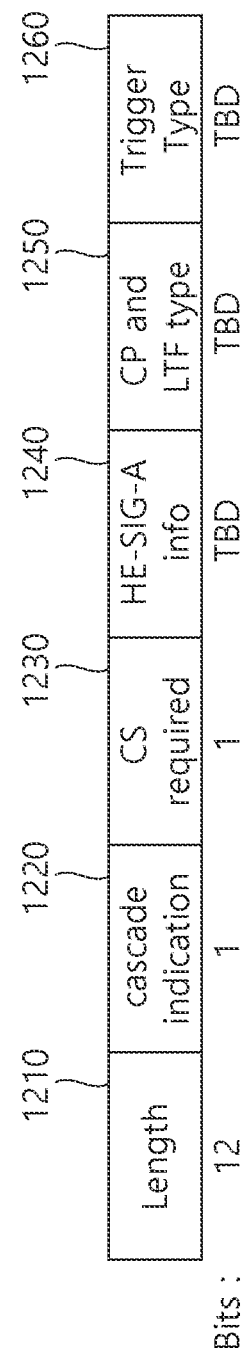
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
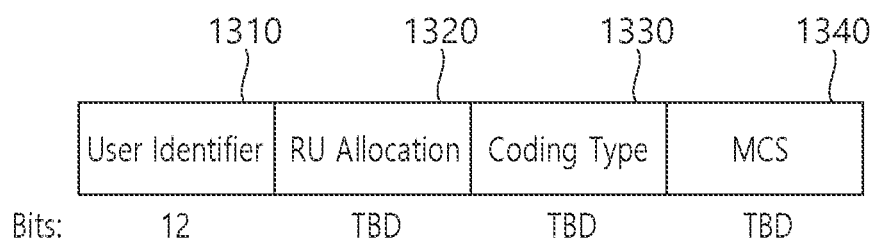
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
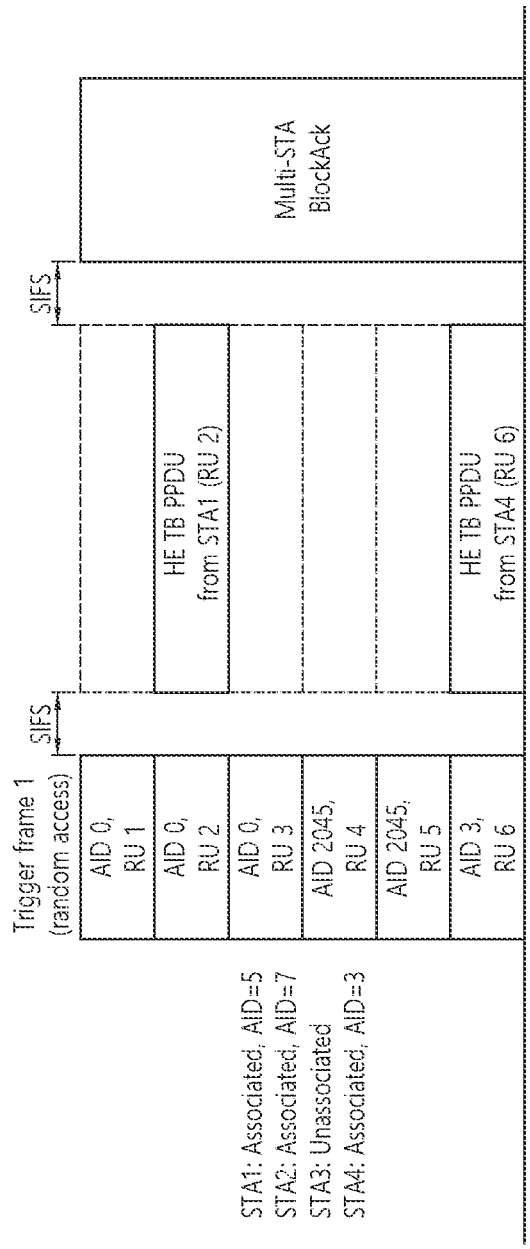
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
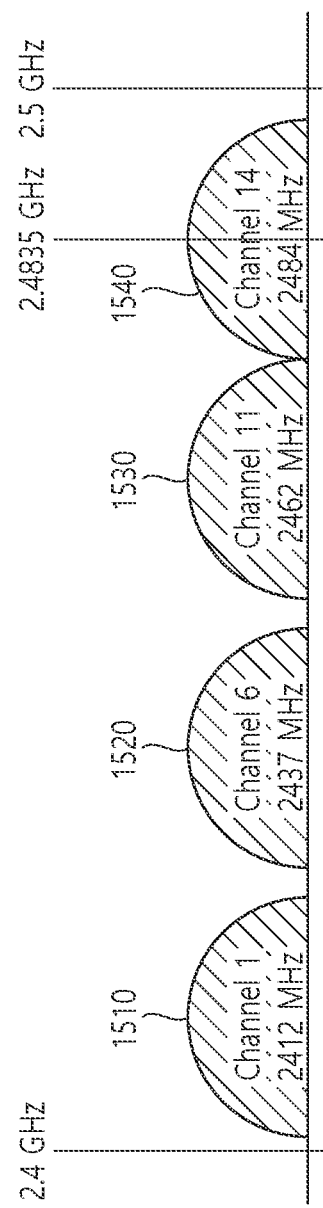
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
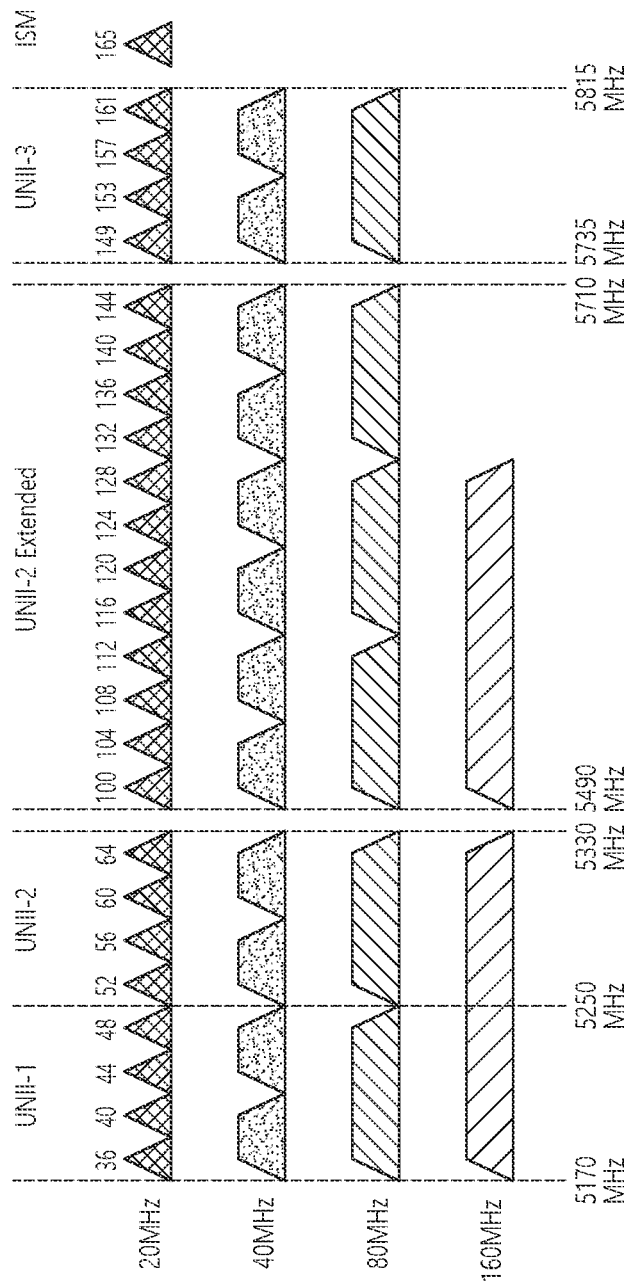
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
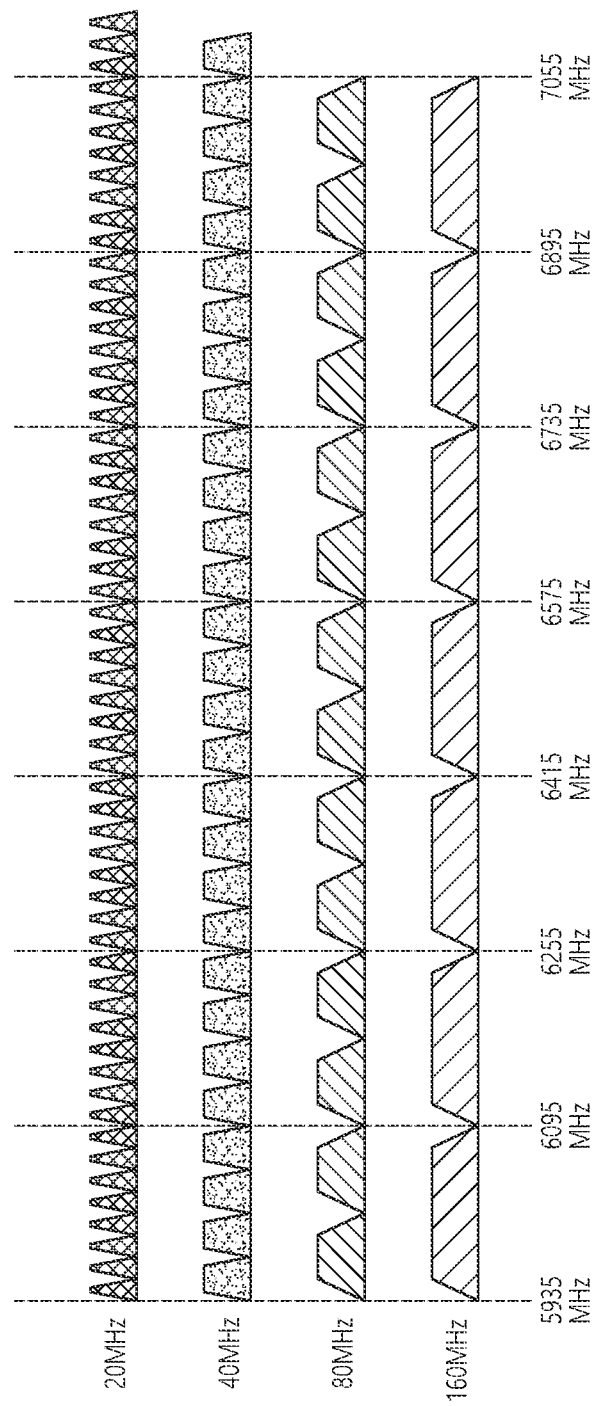
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
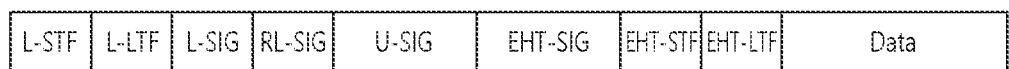
FIG. 18 illustrates an example of a PPDU used in the present specification.

FIG. 18 illustrates an example of a PPDU used in the present specification.

The PPDU of FIG. 18 may be referred to as various terms, such as EHT PPDU, transmitting PPDU, receiving PPDU, first type or Nth type PPDU, and so on. For example, in the present specification, PPDU or EHT PPDU may be referred to by using various terms, such as transmission PPDU, reception PPDU, first type or Nth type PPDU, and so on. Additionally, the EHT PPDU may be used in an EHT system and/or a new WLAN system, which is an enhanced version of the EHT system.

The PPDU of FIG. 18 may represent part or all of a PPDU type that is used in an EHT system. For example, the example of FIG. 18 may be used for both single-user (SU) mode and multi-user (MU) mode, or may be used only for the SU mode, or may be used only for the MU mode. For example, in the EHT system, a trigger-based (TB) PPDU may be separately defined or may be configured based on an example of FIG. 18. A trigger frame and UL-MU operations that are started by the trigger frame (e.g., transmitting operations of the TB PPDU), which are described by at least one of FIG. 10 to FIG. 14, may be directly applied to the EHT system without modification.

In FIG. 18, L-STF to EHT-LTF may be referred to as a preamble or physical preamble, and the L-STF to EHT-LTF may be generated/transmitted/received/obtained/decoded in a physical layer.

Subcarrier spacing of the L-LTF, L-STF, L-SIG, RL-SIG, U-SIG, and EHT-SIG fields of FIG. 18 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 18, L-LTF and L-STF may be the same as the fields of the prior art (or related art).

The L-SIG field of FIG. 18 may, for example, include 24 bits of bit information. For example, the 24-bit information may include a 4-bit Rate field, 1 Reserved bit, a 12-bit Length field, 1 Parity bit, and 6 Tail bits. For example, the 12-bit Length field may include information related to a PPDU length or time duration. For example, a value of the 12-bit Length field may be determined based on a type of the PPDU. For example, in case the PPDU is a non-HT PPDU, an HT PPDU, a VHT PPDU, or an EHT PPDU, the value of the Length field may be determined as a multiple of 3. For example, in case the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

For example, a transmitting STA may apply BCC encoding, which is based on a 1/2-code rate for 24-bit information of the L-SIG field. Afterwards, the transmitting STA may obtain 48 bits of BCC encoding bits. Then, BPSK modulation may be applied to the 48 encoding bits so as to generate 48 BPSK symbols. The transmitting STA may map the 48 BPSK symbols to positions excluding a pilot subcarrier {Subcarrier indexes −21, −7, +7, +21} and a DC subcarrier {Subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to subcarrier indexes {−28, −27, +27, +28}. The aforementioned signal may be used for channel estimation for a frequency domain corresponding to {−28, −27, +27, +28}.

The transmitting STA may generate an RL-SIG, which is generated identically as the L-SIG. The receiving STA may know that the reception PPDU is an HE PPDU or EHT PPDU based on the presence (or existence) of an RL-SIG.

A Universal SIG (U-SIG) may be inserted after the RL-SIG of FIG. 18. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

For example, A-bit information (e.g., 52 un-coded bits) may be transmitted through the U-SIG (or U-SIG field), and a first symbol of the U-SIG may transmit first X-bit information (e.g., 26 un-coded bits) among the total of A bits of the corresponding information, and a second symbol of the U-SIG may transmit remaining Y-bit information (e.g., 26 un-coded bits) of the A-bit information. For example, the transmitting STA may obtain 26 un-coded bits that are included in each U-SIG symbol. The transmitting STA may perform convolutional encoding (i.e., BCC encoding) based on a rate of R=1/2 so as to generate 52-coded bits, and, then, the transmitting STA may perform interleaving on the 52-coded bits. The transmitting STA may perform BPSK modulation on the interleaved 52-coded bits, so as to generate 52 BPSK symbols that are allocated to each U-SIG symbol. One U-SIG symbol may be transmitted based on 56 tones (subcarriers) starting from subcarrier index −28 to subcarrier index +28, with the exception for DC index 0. The 52 BPSK symbols that are generated by the transmitting STA may be transmitted based on the remaining tones (subcarriers) excluding the pilot tones −21, −7, +7, +21 tones.

For example, the A-bit information (e.g., 52 un-coded bits) may include a CRC field (e.g., 4-bit length field) and a Tail field (e.g., 6-bit length field). The CRC field and the Tail field may be transmitted through the second symbol of the U-SIG. The CRC field may be generated based on the 26 bits being allocated to the first symbol of the U-SIG and the remaining 16 bits excluding the CRC/Tail fields from the second symbol. And, the CRC field may be generated based on the related art CRC calculation algorithm. Additionally, the Tail field may be used for terminating a trellis of a convolutional decoder and may, for example, be configured as "000000".

The A-bit information (e.g., 52 un-coded bits) being transmitted by the U-SIG (or U-SIG field) may be divided into version-independent bits and version-dependent bits. For example, a size of the version-independent bits may be fixed or variable. For example, the version-independent bits may be allocated only to the first symbol of the U-SIG or may be allocated to both the first and second symbols of the U-SIG. For example, the version-independent bits and the version-dependent bits may be referred to by using various terms, such as a first control bit and a second control bit.

For example, the version-independent bits of the U-SIG may include a 3-bit PHY version identifier. For example, the 3-bit PHY version identifier may include information related to the PHY version of the transmission/reception PPDU. For example, a first value of the 3-bit PHY version identifier may indicate that the transmission/reception PPDU is an EHT PPDU. In other words, when the transmitting STA transmits the EHT PPDU, the transmitting STA may set the 3-bit PHY version identifier to the first value. In other words, based on the PHY version identifier having the first value, the receiving STA may determine that the reception PPDU is an EHT PPDU.

For example, the version-independent bits of the U-SIG may include a 1-bit UL/DL flag field. A first value of the 1-bit UL/DL flag field is related to UL communication, and a second value of the 1-bit UL/DL flag field is related to DL communication.

For example, the version-independent bits of the U-SIG may include information related to the length of a TXOP, and information related to BSS color ID.

For example, in case the EHT PPDU is divided into various types (e.g., EHT PPDU related to SU mode, EHT PPDU related to MU mode, EHT PPDU related to a Trigger Frame, EHT PPDU related to Extended Range transmission, and so on), information related to the EHT PPDU type may be included in the version-dependent bits of the U-SIG.

For example, the U-SIG may include information related to 1) a bandwidth field including information related to a bandwidth, 2) a field including information related to an MCS scheme being applied to the EHT-SIG, 3) an indication field including information related to whether or not a dual subcarrier modulation (DCM) scheme is applied to the EHT-SIG, 4) a field including information related to a number of symbols being used for the EHT-SIG, 5) a field including information related to whether or not the EHT-SIG is generated throughout the whole band, 6) a field including information related to an EHT-LTF/STF type, 7) a field indicating an EHT-LTF length and a CP length.

Preamble puncturing may be applied to the PPDU of FIG. 18. Preamble puncturing means applying puncturing to a partial band (e.g., a Secondary 20 MHz band) of the whole band of a PPDU. For example, when an 80 MHz PPDU is transmitted, the STA may apply puncturing to a secondary 20 MHz band of the 80 MHz band and may transmit the PPDU only through a primary 20 MHz band and a secondary 40 MHz band.

For example, a pattern of preamble puncturing may be preset (or predetermined). For example, when a first puncturing pattern is applied, the puncturing may be applied only for a secondary 20 MHz band within the 80 MHz band. For example, when a second puncturing pattern is applied, the puncturing may be applied to only one of the two secondary 20 MHz bands that are included in the secondary 40 MHz band within the 80 MHz band. For example, when a third puncturing pattern is applied, the puncturing may be applied only to a secondary 20 MHz band that is included in a primary 80 MHz band within a 160 MHz band (or 80+80 MHz band). For example, when a fourth puncturing pattern is applied, and when a primary 40 MHz band that is included in a primary 80 MHz band within a 160 MHz band (or 80+80 MHz band) is present, the puncturing may be applied to at least one 20 MHz channel that does not belong to the primary 40 MHz band.

Information related to the preamble puncturing that is applied to the PPDU may be included in the U-SIG and/or EHT-SIG. For example, a first field of the U-SIG may include information related to a contiguous bandwidth of the PPDU, and a second field of the U-SIG may include information related to preamble puncturing that is applied to the PPDU.

For example, the U-SIG and EHT-SIG may include information related to preamble puncturing based on the following method. When the bandwidth of a PPDU exceeds 80 MHz, the U-SIG may be separately configured in 80 MHz units. For example, when the bandwidth of a PPDU is 160 MHz, a first U-SIG for a first 80 MHz band and a second U-SIG for a second 80 MHz band may be included in the corresponding PPDU. In this case, a first field of the first U-SIG may include information related to the 160 MHz bandwidth, and a second field of the first U-SIG may include information related to preamble puncturing (i.e., information related to a preamble puncturing pattern) that is applied to the first 80 MHz band. Additionally, a first field of the second U-SIG may include information related to the 160 MHz bandwidth, and a second field of the second U-SIG may include information related to preamble puncturing (i.e., information related to a preamble puncturing pattern) that is applied to the second 80 MHz band. Meanwhile, an EHT-SIG that is contiguous to the first U-SIG may include information related to preamble puncturing (i.e., information related to a preamble puncturing pattern) that is applied to the second 80 MHz band, and an EHT-SIG that is contiguous to the second U-SIG may include information related to preamble puncturing (i.e., information related to a preamble puncturing pattern) that is applied to the first 80 MHz band.

Additionally or alternatively, the U-SIG and EHT-SIG may include information related to preamble puncturing based on the following method. The U-SIG may include information related to preamble puncturing (i.e., information related to a preamble puncturing pattern) for all bands. That is, the EHT-SIG may not include information related to preamble puncturing, and only the U-SIG may include information related to preamble puncturing (i.e., information related to a preamble puncturing pattern).

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 18 may include the technical features of an HE-SIG-B, which is indicated in the examples of FIG. 8 to FIG. 9, as they are. The EHT-SIG may also be referred to by using various terms, such as a second SIG field, a second SIG, a second-type SIG, a control signal, a control signal field, a second (type) control signal, and so on.

The EHT-SIG may include N-bit information (e.g., 1-bit information) related to whether an EHT PPDU supports the SU mode or whether an EHT PPDU supports the MU mode.

The EHT-SIG may be configured based on various MCS schemes. As described above, the information related to the MCS scheme being applied to the EHT-SIG may be included in the U-SIG. The EHT-SIG may be configured based on a DCM scheme. For example, among N number of data tones (e.g., 52 data tones) that are allocated for the EHT-SIG, a first modulation scheme may be applied to one half of contiguous tones, and a second modulation scheme may be applied to the remaining half of contiguous tones. That is, the transmitting STA may modulate specific control information to a first symbol based on the first modulation scheme and may allocate the modulated first symbol to one half of contiguous tones. Thereafter, the transmitting STA may modulate the same control information to a second symbol based on the second modulation scheme and may allocated the modulated second symbol to the other half of contiguous tones. As described above, information related to whether or not the DCM scheme is applied to the EHT-SIG (e.g., 1 bit field) may be included in the U-SIG. EHT-STF of FIG. 18 may be used for enhancing automatic gain control estimation in a multiple input multiple output (MIMO) environment or OFDMA environment. And, EHT-LTF of FIG. 18 may be used for estimating a channel in a MIMO environment or OFDMA environment.

The EHT-STF may be set to various types. For example, among the STFs, a first type (i.e., 1×STF) may be generated based on a first type STF sequence in which non-zero coefficients are positioned at 16 subcarrier spacings. An STF signal that is generated based on the first type STF sequence may have a periodicity (or cycle period) of 0.8 μs. And, the signal having the periodicity of 0.8 μs may be repeated 5 times and become a first type STF having a length of 4 μs. For example, among the STFs, a second type (i.e., 2×STF) may be generated based on a second type STF sequence in which non-zero coefficients are positioned at 8 subcarrier spacings. An STF signal that is generated based on the second type STF sequence may have a periodicity (or cycle period) of 1.6 μs. And, the signal having the periodicity of 1.6 μs may be repeated 5 times and become a second type STF having a length of 8 μs. Hereinafter, an example of a sequence (i.e., EHT-STF sequence) for configuring an EHT-STF will be proposed. The following sequence may be modified to various types.

The EHT-STF may be configured based on the following M sequence.

$$M=\{-1,-1,-1,1,1,1,-1,1,1,1,-1,1,1,-1,1\} \quad \text{<Equation 1>}$$

An EHT-STF for a 20 MHz PPDU may be configured based on the following equation. The example shown below may be a first type (i.e., 1×STF) sequence. For example, the first type sequence may be included in an EHT-PPDU and not a trigger-based (TB) PPDU. In the following equation, (a:b:c) may denote durations being defined at b tone spacings (i.e., subcarrier spacings) starting from an a tone index (i.e., subcarrier index) to a c tone index. For example, Equation 2 shown below may represent a sequence that is defined at 16 tone spacings starting from tone index −112 to tone index 112. For an EHT-STF, since subcarrier spacing of 78.125 kHz is applied, the 16 tone spacings may mean that EHT-STF coefficients (or elements) are positioned at 78.125*16=1250 kHz intervals (or spacings). Additionally, * means multiplication (i.e., 'multiplied by'), and sqrt( ) means square root.

$$\text{EHT-STF}(-112:16:112)=\{M\}*(1+j)/\text{sqrt}(2)$$

$$\text{EHT-STF}(0)=0 \quad \text{<Equation 2>}$$

An EHT-STF for a 40 MHz PPDU may be configured based on the following equation. The example shown below may be a first type (i.e., 1×STF) sequence.

$$\text{EHT-STF}(-240:16:240)=\{M,0,-M\}*(1+j)/\text{sqrt}(2) \quad \text{<Equation 3>}$$

An EHT-STF for an 80 MHz PPDU may be configured based on the following equation. The example shown below may be a first type (i.e., 1×STF) sequence.

$$\text{EHT-STF}(-496:16:496)=\{M,1,-M,0,-M,1,-M\}*(1+j)/\text{sqrt}(2) \quad \text{<Equation 4>}$$

An EHT-STF for a 160 MHz PPDU may be configured based on the following equation. The example shown below may be a first type (i.e., 1×STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \quad \text{<Equation 5>}$$

In the EHT-STF for an 80+80 MHz PPDU, a sequence for a lower 80 MHz may be the same as Equation 4. And, in the EHT-STF for the 80+80 MHz PPDU, a sequence for a higher 80 MHz may be configured based on the following equation.

$$\text{EHT-STF}(-496:16:496)=\{-M,-1,M,0,-M,1,-M\}*(1+j)/\text{sqrt}(2) \quad \text{<Equation 6>}$$

Hereinafter, Equation 7 to Equation 11 relate to examples of a second type (i.e., 2× STF) sequence.

$$\text{EHT-STF}(-120:8:120)=\{M,0,-M\}*(1+j)/\text{sqrt}(2) \quad \text{<Equation 7>}$$

An EHT-STF for a 40 MHz PPDU may be configured based on the following equation.

$$\text{EHT-STF}(-248:8:248)=\{M,-1,-M,0,M,-1,M\}*(1+j)/\text{sqrt}(2)$$

$$\text{EHT-STF}(-248)=0$$

$$\text{EHT-STF}(248)=0 \quad \text{<Equation 8>}$$

An EHT-STF for an 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \quad \text{<Equation 9>}$$

An EHT-STF for a 160 MHz PPDU may be configured based on the following equation.

EHT-STF(−1016:16:1016)={M,−1,M,−1,−M,−1,M,0,−
M,1,M,1,−M,1,−M,0,−M,1,−M,1,M,1,−M,0,−M,1,
M,1,−M,1,−M}*(1+j)/sqrt(2)

EHT-STF(−8)=0,EHT-STF(8)=0,

EHT-STF(−1016)=0,EHT-STF(1016)=0    <Equation 10>

In the EHT-STF for an 80+80 MHz PPDU, a sequence for a lower 80 MHz may be the same as Equation 9. And, in the EHT-STF for the 80+80 MHz PPDU, a sequence for a higher 80 MHz may be configured based on the following equation.

EHT-STF(−504:8:504)={−M,1,−M,1,M,1,−M,0,−M,1,
M,1,−M,1,−M}*(1+j)/sqrt(2)

EHT-STF(−504)=0,

EHT-STF(504)=0    <Equation 11>

An EHT-LTF may have first, second, and third types (i.e., 1×, 2×, 4×LTF). For example, the first/second/third type LTF may be generated based on an LTF sequence in which non-zero coefficients are positioned at 4/2/1 subcarrier spacing(s). The first/second/third type LTF may have a time length of 3.2/6.4/12.8 μs. Additionally, various lengths of GI (e.g., 0.8/1/6/3.2 μs) may be applied to the first/second/third type LTF.

Information related to an STF and/or LTF type (including information related to GI that is applied to the LTF) may be included in an SIG A field and/or SIG B field of FIG. 18.

The PPDU (i.e., EHT-PPDU) of FIG. 18 may be configured based on examples of FIG. 5 and FIG. 6.

For example, an EHT PPDU being transmitted over a 20 MHz band, i.e., a 20 MHz EHT PPDU, may be configured based on RUs of FIG. 5. That is, the location of an RU of the EHT-STF, EHT-LTF, data field being included in the EHT PPDU may be determined as shown in FIG. 5.

An EHT PPDU being transmitted over a 40 MHz band, i.e., a 40 MHz EHT PPDU, may be configured based on RUs of FIG. 6. That is, the location of an RU of the EHT-STF, EHT-LTF, data field being included in the EHT PPDU may be determined as shown in FIG. 6.

Since the RU location of FIG. 6 corresponds to 40 MHz, if the pattern of FIG. 6 is repeated two times, a tone plan for 80 MHz may be determined. That is, an 80 MHz EHT PPDU may be transmitted based on a new tone plan in which the RU of FIG. 6 is repeated two times, and not the RU of FIG. 7.

In case the pattern of FIG. 6 is repeated two times, 23 tones (i.e., 11 guard tones+12 guard tones) may be configured in a DC region. That is, a tone plan for an 80 MHz EHT PPDU being allocated based on OFDMA may have 23 DC tones. On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

A tone plan for 160/240/320 MHz may be configured to have a format of repeating the pattern of FIG. 6 multiple times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

1. Tone Plan in 802.11Ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11 ax standard, the subcarrier frequency spacing is 312.5 kHz or 78.125 kHz, and the subcarrier frequency spacing for the RU is 78.125 kHz. That is, a subcarrier index +1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

2. Null Subcarrier and Pilot Subcarrier

A subcarrier and resource allocation in the 802.11ax system will be described.

An OFDM symbol consists of subcarriers, and the number of subcarriers may function as a bandwidth of a PPDU. In the WLAN 802.11 system, a data subcarrier used for data transmission, a pilot subcarrier used for phase information and parameter tacking, and an unused subcarrier not used for data transmission and pilot transmission are defined.

An HE MU PPDU which uses OFDMA transmission may be transmitted by mixing a 26-tone RU, a 52-tone RU, a 106-tone RU, a 242-tone RU, a 484-tone RU, and a 996-tone RU.

Herein, the 26-tone RU consists of 24 data subcarriers and 2 pilot subcarriers. The 52-tone RU consists of 48 data subcarriers and 4 pilot subcarriers. The 106-tone RU consists of 102 data subcarriers and 4 pilot subcarriers. The 242-tone RU consists of 234 data subcarriers and 8 pilot subcarriers. The 484-tone RU consists of 468 data subcarriers and 16 pilot subcarriers. The 996-tone RU consists of 980 data subcarriers and 16 pilot subcarriers.

1) Null Subcarrier

As shown in FIG. 5 to FIG. 7, a null subcarrier exists between 26-tone RU, 52-tone RU, and 106-tone RU locations. The null subcarrier is located near a DC or edge tone to protect against transmit center frequency leakage, receiver DC offset, and interference from an adjacent RU. The null subcarrier has zero energy. An index of the null subcarrier is listed as follows.

| Channel Width | RU Size | Null Subcarrier Indices |
| --- | --- | --- |
| 20 MHz | 26, 52 | ±69, ±122 |
| | 106 | none |
| | 242 | none |
| 40 MHz | 26, 52 | ±3, ±56, ±57, ±110, ±137, ±190, ±191, ±244 |
| | 106 | ±3, ±110, ±137, ±244 |
| | 242, 484 | none |
| 80 MHz | 26, 52 | ±17, ±70, ±71, ±124, ±151, ±204, ±205, ±258, ±259. ±312, ±313, ±366, ±393, ±446, ±447, ±500 |
| | 106 | ±17, ±124, ±151, ±258, ±259, ±366, ±393, ±500 |
| | 242, 484 | none |
| | 996 | none |
| 160 MHz | 26, 52, 106 | {null subcarrier indices in 80 MHz −512, null subcarrier indices in 80 MHz +512} |
| | 242, 484, 996, 2 × 996 | none |

A null subcarrier location for each 80 MHz frequency segment of the 80+80 MHz HE PPDU shall follow the location of the 80 MHz HE PPDU.

2) Pilot Subcarrier

If a pilot subcarrier exists in an HE-LTF field of HE SU PPDU, HE MU PPDU, HE ER SU PPDU, or HE TB PPDU, a location of a pilot sequence in an HE-LTF field and data field may be the same as a location of 4×HE-LTF. In 1×HE-LTF, the location of the pilot sequence in HE-LTF is configured based on pilot subcarriers for a data field multiplied 4 times. If the pilot subcarrier exists in 2×HE-LTF, the location of the pilot subcarrier shall be the same as a location of a pilot in a 4× data symbol. All pilot subcarriers are located at even-numbered indices listed below.

| Channel Width | RU Size | Pilot Subcarrier Indices |
| --- | --- | --- |
| 20 MHz | 26, 52 | ±10, ±22, ±36, ±48, ±62, ±76, ±90, ±102, ±116 |
| | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
| | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252. ±266, ±280, ±292, ±306, ±320, ±334, ±346, ±360, ±372, ±386, ±400, ±414, ±426, ±440, ±454, ±468, ±480, ±494 |
| | 106, 242, 484 | ±24, ±50, ±92, ±118, ±158, ±184. ±226, ±252, ±266, ±292, ±334, ±360, ±400, ±426, ±468, ±494 |
| | 996 | ±24, ±92, ±158, ±226, ±266, ±334, ±400, ±468 |

| Channel Width | RU Size | Pilot Subcarrier Indices |
| --- | --- | --- |
| 160 MHz | 26, 52, 106, 242, 484 996 | {pilot subcarrier indices in 80 MHz −512, pilot subcarrier indices in 80 MHz +512} {for the lower 80 MHz, pilot subcarrier indices in 80 MHz −512, for the upper 80 MHz, pilot subcarrier indices in 80 MHz +512} |

At 160 MHz or 80+80 MHz, the location of the pilot subcarrier shall use the same 80 MHz location for 80 MHz of both sides.

3. HE Transmit Procedure and Low Density Parity Check (LDPC) Tone Mapping

Figure 21:
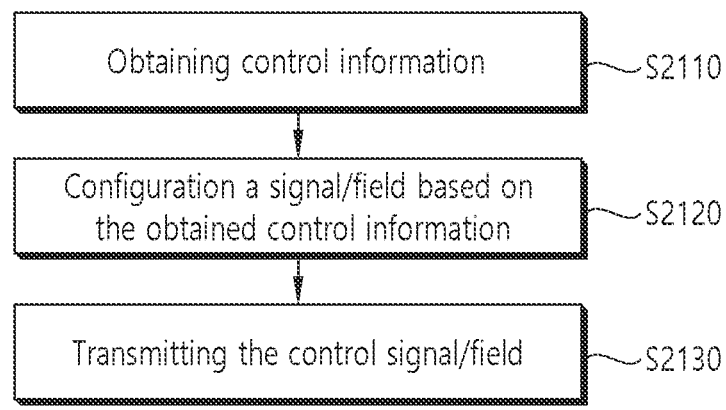
FIG. 21 is a flow diagram illustrating the operation of a transmitting apparatus according to the present embodiment.

In an 802.11ax wireless local area network (WLAN) system, transmission procedures (or transmit procedures) in a physical layer (PHY) include a procedure for an HE Single User (SU) PPDU, a transmission procedure for an HE extended range (ER) SU PPDU, a transmission procedure for an HE Multi User (MU) PPDU, and a transmission procedure for an HE trigger-based (TB) PPDU. A FORMAT field of a PHY-TXSTART.request(TXVECTOR) may be the same as HE_SU, HE_MU, HE ER_SU or HE_TB. The transmission procedures do not describe operations of optional features, such as Dual Carrier Modulation (DCM). Among the diverse transmission procedures, FIG. 21 shows only the PHY transmission procedure for the HE SU PPDU.

Figure 19:
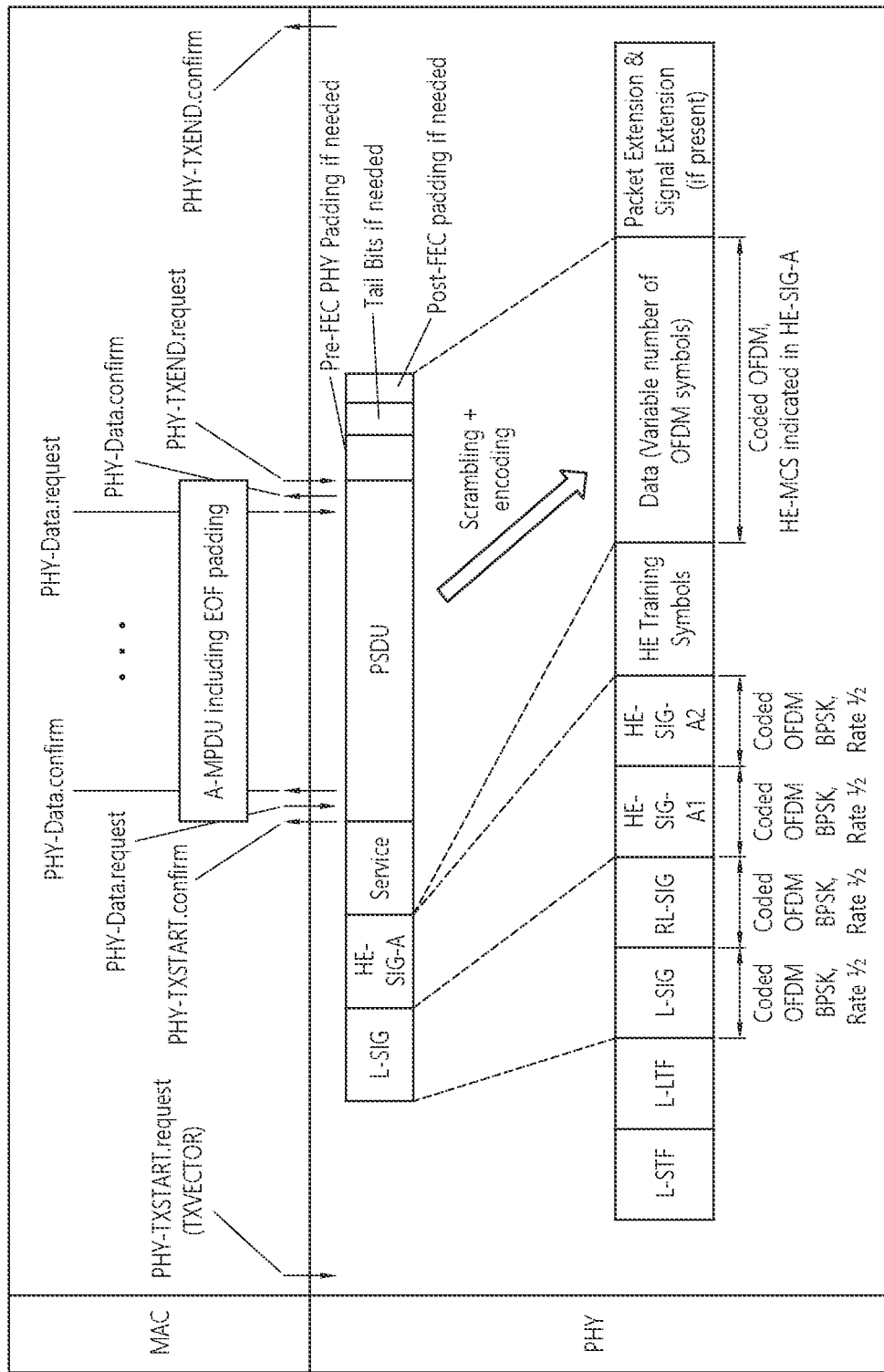
FIG. 19 shows an example of a PHY transmission procedure for HE SU PPDU.

FIG. 19 shows an example of a PHY transmission procedure for HE SU PPDU.

In order to transmit data, the MAC generates a PHY-TXSTART.request primitive, which causes a PHY entity to enter a transmit state. Additionally, the PHY is configured to operate in an appropriate frequency via station management through PLME. Other transmission parameters, such as HE-MCS, coding type, and transmission power are configured through a PHY-SAP by using a PHY-TXSTART.request (TXVECTOR) primitive. After transmitting a PPDU that transfers (or communicates) a trigger frame, a MAC sublayer may issue a PHY-TRIGGER.request together with a TRIGVECTOR parameter, which provides information needed for demodulating an HE TB PPDU response that is expected of the PHY entity.

The PHY indicates statuses of a primary channel and another channel via PHY-CCA.indication. The transmission of a PPDU should be started by the PHY after receiving the PHY-TXSTART.request(TXVECTOR) primitive.

After a PHY preamble transmission is started, the PHY entity immediately initiates data scrambling and data encoding. An encoding method for the data field is based on FEC_CODING, CH_BANDWIDTH, NUM_STS, STBC, MCS, and NUM_USERS parameters of the TXVECTOR.

A SERVICE field and a PSDU are encoded in a transmitter (or transmitting device) block diagram, which will be described later on. Data should be exchanged between the MAC and the PHY through a PHY-DATA.request(DATA) primitive that is issued by the MAC and PHY-DATA. confirm primitives that are issued by the PHY. A PHY padding bit is applied to the PSDU in order to set a number of bits of the coded PSDU to be an integer multiple of a number of coded bits per OFDM symbol.

The transmission is swiftly (or quickly) ended by the MAC through a PHY-TXEND.request primitive. The PSDU transmission is ended upon receiving a PHY-TXEND.request primitive. Each PHY-TXEND.request primitive mat notify its reception together with a PHY-TXEND.confirm primitive from the PHY.

A packet extension and/or a signal extension may exist in a PPDU. A PHY-TXEND.confirm primitive is generated at an actual end time of a most recent PPDU, an end time of a packet extension, and an end time of a signal extension.

In the PHY, a Guard Interval (GI) that is indicated together with a GI duration in a GI_TYPE parameter of the TXVECTOR is inserted in all data OFDM symbols as a solution for a delay spread.

If the PPDU transmission is completed, the PHY entity enters a receive state.

Figure 20:
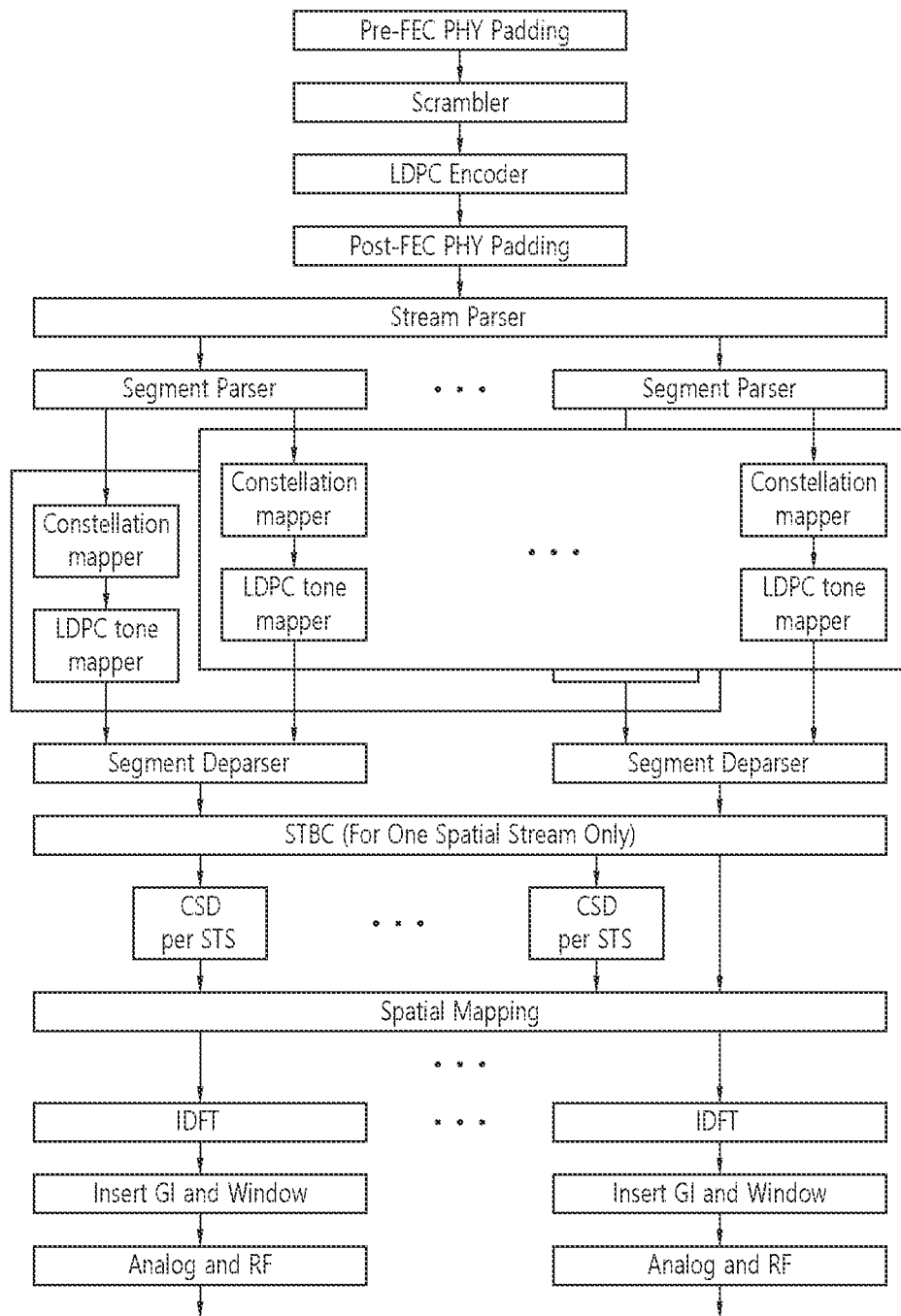
FIG. 20 shows an example of a block diagram of a transmitting device for generating each field of an HE PPDU.

FIG. 20 shows an example of a block diagram of a transmitting device for generating each field of an HE PPDU.

In order to generate each field of the HE PPDU, the following block diagrams are used.
  a) pre-FEC PHY padding
  b) Scrambler
  c) FEC (BCC or LDPC) encoders
  d) post-FEC PHY padding
  e) Stream parser
  f) Segment parser (for contiguous 160 MHz and non-contiguous 80+80 MHz transmission)
  g) BCC interleaver
  h) Constellation mapper
  i) DCM tone mapper
  j) Pilot insertion
  k) Replication over multiple 20 MHz (for BW>20 MHz)
  l) Multiplication by 1st column of PHE-LTF
  m) LDPC tone mapper
  n) Segment deparser
  o) Space time block code (STBC) encoder for one spatial stream
  p) Cyclic shift diversity (CSD) per STS insertion
  q) Spatial mapper
  r) Frequency mapping
  s) Inverse discrete Fourier transform (IDFT)
  f) Cyclic shift diversity (CSD) per chain insertion
  u) Guard interval (GI) insertion
  v) Windowing FIG. 20 shows a block diagram of a transmitting device (or transmitter block diagram) that is used for generating a data field of an HE Single User (SU) PPDU having LDPC encoding applied thereto and being transmitted at a 160 MHz. If the transmitter block diagram is used for generating a data field of an HE SU PPDU that is transmitted in an 80+80 MHz band, a segment deparser is not used as shown in FIG. 20. That is, the block diagram of the transmitter (or transmitting device) is used per 80 MHz band in a situation where the band is divided into an 80 MHz band and another 80 MHz band by using a segment parser.

Referring to FIG. 20, an LDPC encoder may encode a data field (or data bitstream). The data bitstream input to the LDPC encoder may be scrambled by a scrambler.

A stream parser divides the data bitstream encoded by the LDPC encoder into a plurality of spatial streams. At this time, an encoded data bitstream divided into each spatial stream may be referred to as a spatial block. The number of spatial blocks may be determined by the number of spatial streams used to transmit a PPDU and may be set to be equal to the number of spatial streams.

Figure 22:
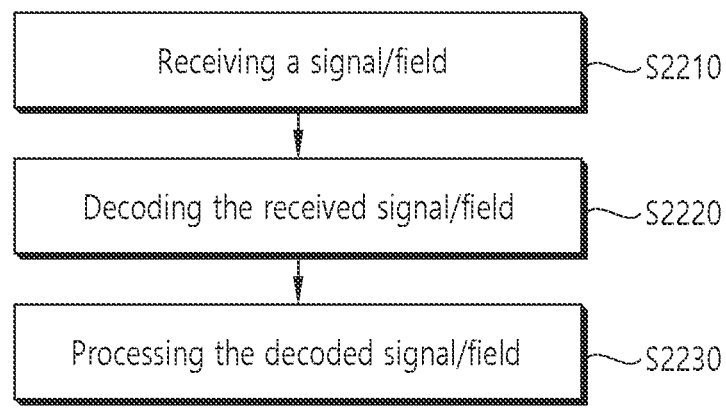
FIG. 22 is a flow diagram illustrating the operation of a receiving apparatus according to the present embodiment.

The stream parser divides each spatial block into at least one or more data segments. As shown in FIG. 22, when the data field is transmitted in a 160 MHz band, the 160 MHz band is divided into two 80 MHz bands, and the data field is divided into a first data segment and a second data segment for the respective 80 MHz bands. Afterward, the first and second data segments may be constellation mapped to the respective 80 MHz bands and may be LDPC mapped.

In HE MU transmission, except that cyclic shift diversity (CSD) is performed based on the information on a space-time stream start index for the corresponding user, a PPDU encoding processor is run independently in a Resource Unit (RU) for each user even for an input to a space mapping block. All the user data of the RU are mapped by being coupled to a transmission chain of the space mapping block.

In the 802.11ax, phase rotation may be applied to the field from the legacy preamble to the field just before the HE-STF, and a phase rotation value may be defined in units of 20 MHz bands. In other words, phase rotation may be applied to L-STF, L-LTF, L-SIG, RL-SIG, HE-SIG-A, and HE-SIG-B among fields of the HE PPDU defined in the 802.11ax.

The L-STF field of the HE PPDU may be constructed as follows.
  a) Determine the channel bandwidth from the TXVECTOR parameter CH_BANDWIDTH.
  b) Sequence generation. Generate the L-STF sequence over the channel bandwidth as described in 27.3.11.3 (L-STF). Apply a 3 dB power boost if transmitting an HE ER SU PPDU as described in 27.3.11.3 (L-STF).
  c) Phase rotation: Apply appropriate phase rotation for each 20 MHz subchannel as described in 27.3.10 (Mathematical description of signals) and 21.3.7.5 (Definition of tone rotation).
  d) CSD per STS: If the TXVECTOR parameter BEAM_CHANGE is 0, apply CSD per STS for each space-time stream and frequency segment as described in 27.3.11.2 2 (Cyclic shift for HE modulated fields).
  e) Spatial mapping: If the TXVECTOR parameter BEAM_CHANGE is 0, apply the A matrix and the Q matrix as described in 27.3.11.3 (L-STF).
  f) IDFT: Compute the inverse discrete Fourier transform
  g) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).
  h) Insert GI and apply windowing: Prepend a GI ($T_{GI,pre-HE}$) and apply windowing as described in 27.3.10 (Mathematical description of signals).
  i) Analog and RF: Upconvert the resulting complex baseband waveform associated with each transmit chain to an RF signal according to the center frequency of the desired channel and transmit. Refer to 27.3.10 (Mathematical description of signals) and 27.3.11 (HE preamble) for details.

The L-LTF field of the HE PPDU may be constructed as follows.
  a) Determine the channel bandwidth from the TXVECTOR parameter CH_BANDWIDTH.
  b) Sequence generation Generate the L-LTF sequence over the channel bandwidth as described in 27.3.11.4 (L-LTF). Apply a 3 dB power boost if transmitting an HE ER SU PPDU as described in 27.3.11.4 (L-LTF).
  c) Phase rotation: Apply appropriate phase rotation for each 20 MHz subchannel as described in 27.3.10 (Mathematical description of signals) and 21.3.7.5 (Definition of tone rotation).
  d) CSD per STS: If the TXVECTOR parameter BEAM_CHANGE is 0, apply CSD per STS for each space-time stream and frequency segment as described in 27.3.11.2.2 (Cyclic shift for HE modulated fields) before spatial mapping.
  e) Spatial mapping: If the TXVECTOR parameter BEAM_CHANGE is 0, apply the A matrix and the Q matrix as described in 27.3.11.4 (L-LTF)
  f) IDFT: Compute the inverse discrete Fourier transform.
  g) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).
  h) Insert GI and apply windowing: Prepend a GI ($T_{GI\text{-}LTF}$) and apply windowing as described in 27.3.10 (Mathematical description of signals).
  i) Analog and RF: Upconvert the resulting complex baseband waveform associated with each transmit chain to an RF signal according to the carrier frequency of the desired channel and transmit. Refer to 27.3.10 (Mathematical description of signals) and 27.3.11 (HE preamble) for details.

The L-SIG field of the HE PPDU may be constructed as follows.
  a) Set the RA IE subfield in the SIGNAL field to 6 Mb/s. Set the LENGTH, Parity, and Tail fields in the SIGNAL field as described in 27.3.11.5 (L-SIG).
  b) BCC encoder Encode the SIGNAL field by a convolutional encoder at the rate of R=1/2 as described in 27.3.12.5.1 (BCC coding and puncturing).
  c) BCC interleaves; Interleave as described in 17.3.5.7 (BCC interleavers).
  d) Constellation Mapper: BPSK modulate as described in 27.3.12.9 (Constellation mapping).
  e) Pilot insertion: Insert pilots as described in 27.3.11.5 (L-STG).
  f) Extra subcarrier insertion: Four extra subcarriers are inserted at k∈(−28, −27, 27, 28) for channel estimation purpose and the values on these four extra subcarriers are {−1, −1, −1, 1}, respectively. Apply a 3 dB power boost to the four extra subcarriers if transmitting an HE ER SU PPDU as described in 27.3.11.5 (L-SIG),
  g) Duplication and phase rotation: Duplicate the L-SIG field over each occupied 20 MHz subchannel of the channel bandwidth. Apply appropriate phase rotation for each occupied 20 MHz subchannel as described in 27.3.10 (Mathematical description of signals) and 21.3.7.5 (Definition of tone rotation).
  h) CSD per STS: If the TXVECTOR parameter BEAM_CHANGE is 0, apply CSD per STS for each space-time stream and frequency segment as described in 27.3.11.2.2 (Cyclic shift for HE modulated fields) before spatial mapping.
  i) Spatial mapping: If the TXVECTOR parameter BEAM_CHANGE is 0, apply the A matrix and Q matrix as described in 27.3.11.5 (L-SIG).
  j) IDFT: Compute the inverse discrete Fourier transform.
  k) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).
  l) Insert GI and apply windowing: Prepend a GI ($T_{GI,pre-HE}$) and apply windowing as described in 27.3.10 (Mathematical description of signals).
  m) Analog and RF: Upconvert the resulting complex baseband waveform associated with each transmit chain. Refer to 27.3.10 (Mathematical description of signals) and 27.3.11 (HE preamble) for details.

The RL-SIG field of the HE PPDU may be constructed as follows.

a) Set the RATE, subfield in the repeat SIGNAL field to 6 Mb/s Set the LENGTH Parity, and Tail fields in the repeat SIGNAL field as described in 27.3.11.6 (RL-STG).

b) BCC encoder: Encode the repeat SIGNAL field by a convolutional encoder al the rate of R=1/2 as described in 27.3.12.5.1 (BCC coding and puncturing).

c) BCC interleaver: Interleave as described in 17.3.5.7 (BCC interleavers).

d) Constellation Mapper: BPSK modulate as described in 27.3.12.9 (Constellation mapping).

e) Pilot insertion: Insert pilots as described in 27.3.11.6 (RL-SIG).

f) Extra subcarrier insertion: Four extra subcarriers are inserted at k c (−28, −27, 27, 28) for channel estimation purpose and the values on these four extra subcarriers are {−1, −1, −1, 1}, respectively. Apply a 3 dB power boost to the four extra subcarriers if transmitting an HE ER SU PPDU as described in 27.3.11.6 (RL-SIG).

g) Duplication and phase rotation: Duplicate the RL-SIG field over each occupied 20 MHz subchannel of the channel bandwidth. Apply appropriate phase rotation for each occupied 20 MHz subchannel as described in 27.3.10 (Mathematical description of signals) and 21.3.7.5 (Definition of tone rotation).

h) CSD per STS: If the TXVECTOR parameter BEAM_CHANGE is 0, apply CSD per STS for each space-time stream and frequency segment as described in 27.3.11.2.2 (Cyclic shift for HE modulated fields) before spatial mapping, i) Spatial mapping: If the TXVECTOR parameter BEAM_CHANGE is 0, apply the A matrix and the Q matrix as described in 27.3.11.6 (RL-SIG).

j) IDFT: Compute the inverse discrete Fourier transform.

k) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).

l) Insert GI and apply windowing: Prepend a GI ($T_{GI,Pre-HE}$) and apply windowing as described in 27.3.10 (Mathematical description of signals).

m) Analog and RE: Upconvert the resulting complex baseband waveform associated with each transmit chain. Refer to 27.3.10 (Mathematical description of signals) and 27.3.11 (HE preamble) for details.

In what follows, a phase rotation value will be described.

$Y_{k,BW}$ is used for representing phase rotation of a tone. $Y_{k,BW}$ for each bandwidth is determined as follows using TXVECTOR parameter CH_BANDWIDTH.

| CH_BANDWIDTH | 7 $Y_k$, BW |
| --- | --- |
| CBW20 | $Y_{k, 20}$ |
| CBW40 | $Y_{k, 40}$ |

-continued

| CH_BANDWIDTH | 7 $Y_k$, BW |
| --- | --- |
| CBW80 | $Y_{k, 80}$ |
| CBW160 | $Y_{k, 160}$ |
| CBW80 + 80 | $Y_{k, 80}$ per frequency segment |

The value of $Y_{k,BW}$ for each bandwidth is as follows.
For a 20 MHz PPDU transmission, $$Y_{k,20}=1 \qquad (21\text{-}14)$$

For a 40 MHz PPDU transmission, $$Y_{k,40} = \begin{cases} 1, & k < 0 \\ j, & k \geq 0 \end{cases} \qquad (21\text{-}15)$$

For an 80 MHz PPDU transmission, $$Y_{k,80} = \begin{cases} 1, & k < -64 \\ -1, & k \geq -64 \end{cases} \qquad (21\text{-}16)$$

For an 80+80 MHz PPDU transmission, each 80 MHz frequency segment shall use the phase rotation for 80 MHz PPDU transmissions as defined in Equation (21-16).
For a 160 MHz PPDU transmission.

$$Y_{k,80} = \begin{cases} 1, & k < -192 \\ -1, & -192 \leq k < 0 \\ 1, & 0 \leq k < 64 \\ -1, & 64 \leq k \end{cases} \qquad (21\text{-}17)$$

Since the phase rotation value is defined in units of 20 MHz bands, the phase rotation value used for transmission of a 80 MHz PPDU is [1, −1, −1, −1], and the phase rotation value used for transmission of a 80+80 MHz or 160 MHz PPDU is [1, −1, −1, −1, 1, −1, −1, −1].

4. Embodiment Applicable to the Present Disclosure

The WLAN 802.11 system supports transmission of an increased stream using a band wider than that of the existing 11ax or more antennas to increase the peak throughput. The present disclosure also considers a method of using aggregation of various bands.

The present disclosure proposes phase rotation applied to the legacy preamble and the EHT-SIG part (or up to the field right before the EHT-STF) of a PPDU when the PPDU is transmitted using a broadband (240 MHz or 320 MHz).

The 802.11be PPDU (EHT PPDU) may be composed of L-preamble such as the L-STF, L-LTF, L-SIG, and RL-SIG and EHT part such as the EHT-Signature, EHT-SIG (A/B/C), EHT-STF, EHT-LTF, and Data; and some fields may not be present, or another field may be inserted. When the transmitter transmits a PPDU, phase rotation may be applied to decrease PAPR, which may be applied to the fields from the L-preamble to the field right before the EHT-STF, and a phase rotation value may be defined in units of 20 MHz bands.

The 802.11be system may use the bandwidth of contiguous 240/320 MHz and non-contiguous 160+80/80+160/ 160+160 MHz in addition to the existing 20/40/80/160/80+ 80 MHz bandwidth. Here, 240/160+80/80+160 MHz may be considered to be formed by puncturing the 80 MHz part at 320/160+160 MHz; in other words, phase rotation values used in the 320/160+160 MHz may be applied to the 240/160+80/80+160 MHz except for the phase rotation value in the punctured 80 MHz part. Therefore, the present disclosure first proposes optimal phase rotation (embodiment 4.1.1) for 320/160+160 MHz, and the phase rotation for 240/160+80/80+160 MHz (embodiment 4.2.1) created by puncturing the aforementioned band will be described later. Also, the present embodiment proposes additional optimal phase rotation for the 240/160+80/80+160 MHz (embodiment 4.2.2).

4.1. 320/160+160 MHz

The present disclosure proposes phase rotation based on contiguous 320 MHz, and phase rotation for non-contiguous 160+160 MHz may be proposed as follows. The phase rotation for the 160 MHz part corresponding to the lower frequency of contiguous 320 MHz is applied directly to the phase rotation for the 160 MHz part corresponding to the lower frequency of non-contiguous 160+160 MHz. And the phase rotation for the 160 MHz part corresponding to the higher frequency of the contiguous 320 MHz is applied directly to the phase rotation for the 160 MHz part corresponding to the higher frequency of non-contiguous 160+160 MHz.

The subcarrier index of contiguous 320 MHz ranges from −512 to 511, and various phase rotation values proposed below have the following form.

[a b c d e f g h i j k l m n o p]

The form above means phase rotation applied to each 20 MHz part from a 20 MHz band in the low-frequency region to a 20 MHz band in the high-frequency region. In other words, a is a phase rotation value applied to a subcarrier having subcarrier indexes from −512 to −449; b from −448 to −385; c from −384 to −321; d from −320 to −257; e from −256 to −193; f from −192 to −129; g from −128 to −65, h from −64 to −1; i from 0 to 63; j from 64 to 127; k from 128 to 191; l from 192 to 255; m from 256 to 319; n from 320 to 383; o from 384 to 447; and p from 448 to 511.

Calculation of PAPR uses the L-STF and the L-LTF, which are assumed to be four times larger than the size of IFFT.

4.1.1. Optimal Phase Rotation

The present disclosure proposes optimal phase rotation to optimize the PAPR at 320 MHz by considering various RF capabilities in a full band allocation situation as described below. It is clear that different phase rotation values are applied in units of 80 MHz or 160 MHz bands to increase implementation complexity; however, considering various hardware capabilities, the phase rotation according to the present disclosure may always guarantee stable performance.

4.1.1.A. Full Band Allocation Case (Non-Preamble Puncturing Case)

This case corresponds to a situation in which the whole bandwidth is used for PPDU transmission. Optimal phase rotation is proposed by considering the RF maximum transmission bandwidth capability below, and the maximum PAPR may be obtained for the corresponding case.

4.1.1.A.0. Consideration of 320 MHz RF Capability

A transmitting STA may transmit a PPDU using one 320 MHz RF capability (capa). In this case, the phase rotation that minimizes the max PAPR value of the L-STF may be expressed as follows.

[1 −j j −1 1 −1 −1 1 −j 1 1 j j 1 1 1]

The same PAPR may be obtained even when the entire values are additionally multiplied by a specific value, for which case the max PAPR is given as follows.

TABLE 5

| L-STF | L-LTF |
|---|---|
| 4.2494 | 5.4333 |

Meanwhile, the phase rotation that minimizes the max PAPR value of the L-LTF may be expressed as follows.

[−1 −j −j 1 j 1 j −j j −1 −1 j −j −1 j]

The same PAPR may be obtained even when the entire values are additionally multiplied by a specific value, for which case the max PAPR is given as follows.

TABLE 6

| L-STF | L-LTF |
|---|---|
| 4.4262 | 5.1594 |

4.1.1.A.1. Consideration of 160/320 MHz RF Capability

A transmitting STA may transmit a PPDU using two 160 MHz capa RFs or one 320 MHz capa RF. In this case, the phase rotation that minimizes the max PAPR value of the L-STF may be expressed as follows.

[1 −1 −1 −1 −j j j j −j j 1 1 1 −1]

The same PAPR may be obtained even when the entire values are additionally multiplied by a specific value, for which case the max PAPR is given as follows.

TABLE 7

| L-STF | L-LTF |
|---|---|
| 4.7126 | 6.1506 |

Meanwhile, the phase rotation that minimizes the max PAPR value of the L-LTF may be expressed as follows.

[1 j −1 j j 1 −j 1 1 j −1 j −j −1 j −1]

The same PAPR may be obtained even when the entire values are additionally multiplied by a specific value, for which case the max PAPR is given as follows.

TABLE 8

| L-STF | L-LTF |
|---|---|
| 4.7126 | 6.1506 |

Meanwhile, the phase rotation that minimizes the max PAPR value of the L-LTF may be expressed as follows. [1 j −1 j j 1 −j 1 1 j −1 j −j −1 j −1]

The same PAPR may be obtained even when the entire values are additionally multiplied by a specific value, for which case the max PAPR is given as follows.

TABLE 9

| L-STF | L-LTF |
|---|---|
| 5.0796 | 5.7351 |

4.1.1.A.2. Consideration of 80/160/320 MHz RF Capability

A transmitting STA may transmit a PPDU using four 80 MHz capa RFs or two 80 MHz capa RFs and one 160 MHz capa RF or two 160 MHz capa RFs or one 320 MHz capa RF. When two 80 MHz capa RFs and one 160 MHz capa RF are used, only the case in which 160 MHz RF is applied to one of the two 160 MHz bands is considered. In other words, the case in which the 160 MHz RF is used in the middle 160 MHz while the two 80 MHz RFs are applied to both of the remaining 80 MHz bands is not taken into consideration. In this case, the max PAPR value of the L-STF is given as follows.

[1 −1 −1 −1 −j j j j j −j j 1 1 1 −1]

The same PAPR may be obtained even when the entire values are additionally multiplied by a specific value, for which case the max PAPR is given as follows.

TABLE 10

| L-STF | L-LTF |
|---|---|
| 4.7126 | 6.1506 |

Meanwhile, the phase rotation that minimizes the max PAPR value of the L-LTF may be expressed as follows.

[1 j −1 j j 1 −j 1 1 j −1 j −j −1 j −1]

The same PAPR may be obtained even when the entire values are additionally multiplied by a specific value, for which case the max PAPR is given as follows.

TABLE 11

| L-STF | L-LTF |
|---|---|
| 5.0796 | 5.7351 |

The phase rotation values proposed in 4.1.1.A.2 may be relatively better if various RF capacities are considered. However, if constraints on the number of RFs for actual implementation or convenience issues, the phase rotation values of 4.1.1.A.1 may be preferred.

4.2. 240/80+160/160+80 MHz

4.2.1. 320/160+160 MHz Phase Rotation with Punctured 80 MHz

The 240 MHz transmission may be considered to be 320 MHz with punctured 80 MHz; therefore, the phase rotation for the 320 MHz may be unified without designing a separate phase rotation for 240 MHz. For example, suppose that phase rotation of [1 j −1 j j 1 −j 1 1 j −1 j −j −1 j −1] is used at 320 MHz (phase rotation optimized for the L-LTF of 4.1.1.A.1), and a first 80 MHz channel is punctured and used for 240 MHz transmission. Then, the following phase rotation value may be applied to the 240 MHz.

[j 1 −j 1 1 j −1 j −j −1]

When a second 80 MHz channel of the 320 MHz band is punctured, the following phase rotation value may be applied to the 240 MHz.

[1 j −1 j 1 j −1 j −j −1]

When a third 80 MHz channel of the 320 MHz band is punctured, the following phase rotation value may be applied to the 240 MHz.

[1 j −1 j j 1 −j 1 −j −1]

When a fourth 80 MHz channel of the 320 MHz band is punctured, the following phase rotation value may be applied to the 240 MHz.

[1 j −1 j j 1 −j 1 1 j]

In what follows, additional 240 MHz phase rotation is proposed.

The present disclosure proposes phase rotation based on contiguous 240 MHz, and phase rotation for non-contiguous 80+160/160+80 MHz may be proposed as follows. The phase rotation for the 80/160 MHz part corresponding to the lower frequency of contiguous 240 MHz is applied directly to the phase rotation for the 80/160 MHz part corresponding to the lower frequency of non-contiguous 80+160/160+80 MHz. And the phase rotation for the 160/80 MHz part corresponding to the higher frequency of the contiguous 240 MHz is applied directly to the phase rotation for the 160/80 MHz part corresponding to the higher frequency of non-contiguous 80+160/160+80 MHz.

The subcarrier index of contiguous 240 MHz ranges from −384 to 383, and various phase rotation values proposed below have the following form.

[a b c d e f g h i j k l]

The form above means phase rotation applied to each 20 MHz part from a 20 MHz band in the low-frequency region to a 20 MHz band in the high-frequency region. In other words, a is a phase rotation value applied to a subcarrier having subcarrier indexes from −384 to −321; b from −320 to −257; c from −256 to −193; d from −192 to −129; e from −128 to −65; f from −64 to −1; g from 0 to 63, h from 64 to 127; i from 128 to 191; j from 192 to 255; k from 256 to 319; and l from 320 to 383.

Calculation of PAPR uses the L-STF and the L-LTF, which are assumed to be four times larger than the size of IFFT.

4.2.2. Optimal Phase Rotation

The present disclosure proposes optimal phase rotation to optimize the PAPR at 320 MHz by considering various RF capabilities in a full band allocation situation as described below. It is clear that different phase rotation values are applied in units of 80 MHz or 160 MHz bands to increase implementation complexity; however, considering various hardware capabilities, the phase rotation according to the present disclosure may always guarantee stable performance. At this time, the maximum transmission capability of RF considers 320 MHz but does not consider 240 MHz capability. This is to avoid additional IFFT implementation for 240 MHz and thus obtain implementation gain.

4.2.2.A. Full Band Allocation Case (Non-Preamble Puncturing Case)

This case corresponds to a situation in which the whole bandwidth is used for PPDU transmission. An optimal phase rotation value is proposed considering the RF maximum transmission bandwidth capability, and the maximum PAPR may be obtained from the optimal phase rotation value.

4.2.2.A.0. Consideration of 320 MHz RF Capability

A transmitting STA may transmit a PPDU using one 320 MHz capa RF. In this case, the phase rotation that minimizes the max PAPR value of the L-STF may be expressed as follows.

[j −1 −j −1 −j −1 −j −1 j 1 −j]

The same PAPR may be obtained even when the entire values are additionally multiplied by a specific value, for which case the max PAPR is given as follows.

TABLE 12

| L-STF | L-LTF |
|---|---|
| 4.2242 | 5.3003 |

Meanwhile, the phase rotation that minimizes the max PAPR value of the L-LTF may be expressed as follows.

[1 1 1 1 −1 −1 1 1 −1 1 −1 1]

The same PAPR may be obtained even when the entire values are additionally multiplied by a specific value, for which case the max PAPR is given as follows.

TABLE 13

| L-STF | L-LTF |
|---|---|
| 4.2870 | 5.0202 |

4.2.2.A.1. Consideration of 80/160/320 MHz RF Capability

A transmitting STA may transmit a PPDU using three 80 MHz capa RFs, or one 80 MHz capa RF and one 160 MHz capa RF, or one 320 MHz capa RF. In this case, the phase rotation that minimizes the max PAPR value of the L-STF/L-LTF is given as follows.

[1 1 −1 1 1 1 1 −1 −1 −1 1 −1]

The same PAPR may be obtained even when the entire values are additionally multiplied by a specific value, for which case the max PAPR is given as follows.

TABLE 14

| L-STF | L-LTF |
|---|---|
| 5.2454 | 6.1761 |

Phase rotation of 240 MHz may prefer the method of 4.2.1 when 240 MHz is configured using puncturing of 320 MHz, in which case implementation gain may be obtained from a phase rotation value unified with a phase rotation value for the 320 MHz. Also, considering the PAPR and various RF capabilities, the phase rotation proposed in 4.2.2.A.1 may be helpful.

FIG. 21 is a flow diagram illustrating the operation of a transmitting apparatus according to the present embodiment.

The phase rotation may be applied according to one example of FIG. 21.

A transmitting apparatus (an AP and/or a non-AP STA) may perform the example of FIG. 21. Part of the steps in the example of FIG. 21 may be omitted or modified.

In the S2110 step, the transmitting apparatus (a transmitting STA) may obtain control information for an STF sequence. For example, the transmitting apparatus may obtain information on the bandwidth (for example, 80/160/240/320 MHz) applied to the STF sequence. Additionally or alternatively, the transmitting apparatus may obtain information on the features applied to the STF sequence (for example, information instructing to generate a 1×, 2×, or 4× sequence).

In the S2120 step, the transmitting device may configure or generate a control signal/control field (for example, EHTTSF signal/field) based on the obtained control information (for example, information on the bandwidth).

The S2120 step may include more specific sub-steps. For example, the S2120 step may further include selecting one STF sequence from among a plurality of STF sequences based on the control information obtained from the S2110 step. Additionally or alternatively, the S2120 step may further include performing power boosting.

The S2120 step may be referred to as the step of generating a sequence.

In the S2130 step, the transmitting apparatus may transmit a signal/field/sequence to a receiving apparatus through the S2120 step.

The S2130 step may include more specific sub-steps.

For example, the transmitting apparatus may perform a phase rotation step. Specifically, the transmitting apparatus may perform the phase rotation step on a sequence generated through the S2120 step in 20 MHz*N (where N is an integer) units.

Additionally or alternatively, the transmitting apparatus may perform at least one of the CSD, spatial mapping, IDFT/IFFT, and GI insert operations.

A signal/field/sequence configured according to the present disclosure may be transmitted in the form of FIG. 18.

The phase rotation may be applied based on the apparatus of FIG. 20.

The example of FIG. 21 is related to a transmitting apparatus (an AP and/or a non-AP STA).

As shown in FIG. 1, a transmitting apparatus may include a memory 112, a processor 111, and a transceiver 113.

The memory 112 may store information on a plurality of STF sequences according to the present disclosure. Also, the memory 112 may store control information for generating an STF sequence/PPDU.

The processor 111 may generate various sequences (for example, an STF sequence) based on the information stored in the memory 112 and configure a PPDU. FIG. 18 shows an example of a PPDU generated by the processor 111.

The processor 111 may perform part of the operations shown in FIG. 21. For example, the processor 111 may obtain control information for generating an STF sequence and configure the STF sequence.

For example, the processor 111 may include an additional sub-unit. A sub-unit included in the processor 111 may be configured as shown in FIG. 20. In other words, as shown in the figure, the processor 111 may perform operations such as CSD, spatial mapping, IDFT/IFFT, and GI insert operations.

The transceiver 113 shown in the figure may include an antenna and perform analog signal processing. Specifically, the processor 111 may control the transceiver 113 to transmit a PPDU generated by the processor 111.

FIG. 22 is a flow diagram illustrating the operation of a receiving apparatus according to the present embodiment.

The phase rotation may be applied according to one example of FIG. 22.

A receiving apparatus (an AP and/or a non-AP STA) may perform the example of FIG. 22.

A receiving STA or a receiving apparatus (an AP and/or a non-AP STA) may perform the example of FIG. 22. Part of the steps (or specific sub-steps to be described later) in the example of FIG. 22 may be omitted or modified.

In the S2210 step, the receiving device (receiving STA) may receive a signal/field including an STF sequence (namely, an EHTSTF/EHTS sequence) through the S2210 step. The received signal may be in the form of FIG. 18.

Sub-steps of the S2210 step may be determined based on the S2130 step. In other words, the S2210 step may perform an operation of restoring the results of the phase rotation CSD, spatial mapping, IDFT/IFFT, and GI insert operations applied in the S2130 step.

In the S2210 step, the STF sequence may perform various functions such as seeking time/frequency synchronization of a signal or estimating an AGC gain.

In the S2220 step, the receiving apparatus may decode a received signal based on the STF sequence.

For example, the S2220 step may include decoding a data field of a PPDU that includes the STF sequence. In other words, the receiving apparatus may decode a signal included in the data field of a successfully received PPDU based on the STF sequence.

The receiving apparatus may process data decoded through the S2230 step.

For example, the receiving apparatus may perform a processing operation of transferring data decoded through the S2230 step to an upper layer (for example, MAC layer). Also, a subsequent operation may be performed when signal generation is instructed from the upper layer to the PHY layer in response to the data transferred to the upper layer.

The phase rotation may be applied based on the apparatus of FIG. 20.

The example of FIG. 22 is related to a receiving apparatus (an AP and/or a non-AP STA).

As shown in FIG. 1, a transmitting apparatus may include a memory 112, a processor 111, and a transceiver 113.

The memory 112 may store information on a plurality of STF sequences according to the present disclosure. Also, the memory 112 may store control information for generating an STF sequence/PPDU.

The processor 111 may generate various sequences (for example, an STF sequence) based on the information stored in the memory 112 and configure a PPDU. FIG. 18 shows an example of a PPDU generated by the processor 111.

The processor 111 may perform part of the operations shown in FIG. 22. For example, the processor 111 may obtain control information for generating an STF sequence and configure the STF sequence.

For example, the processor 111 may include an additional sub-unit. A sub-unit included in the processor 111 may be configured as shown in FIG. 20. In other words, as shown in the figure, the processor 111 may perform operations such as CSD, spatial mapping, IDFT/IFFT, and GI insert operations.

The transceiver 113 shown in the figure may include an antenna and perform analog signal processing. Specifically, the processor 111 may control the transceiver 113 to transmit a PPDU generated by the processor 111.

Part of technical features shown in FIG. 20 may be implemented by the transceiver 113. Specifically, the transceiver 113 may include the analog RF processing shown in the figure.

In what follows, the embodiment above will be described with reference to FIGS. 1 to 22.

Figure 23:
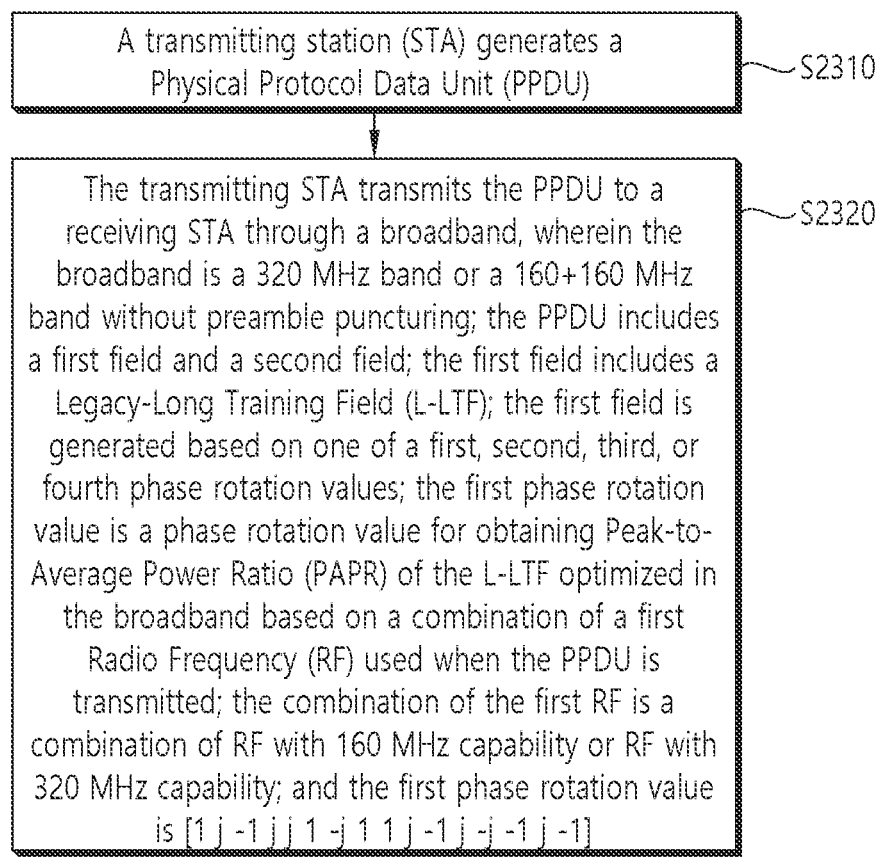
FIG. 23 is a flow diagram illustrating a procedure for a transmitting STA to transmit a PPDU according to the present embodiment.

FIG. 23 is a flow diagram illustrating a procedure for a transmitting STA to transmit a PPDU according to the present embodiment.

One example of FIG. 23 may be performed in a network supporting the next-generation wireless LAN system (the IEEE 802.11be or EHT wireless LAN system). The next-generation wireless LAN system is an improved version of the 802.11ax system and may satisfy backward compatibility with the 802.11ax system.

A transmitting STA may perform one example of FIG. 23, and the transmitting STA may correspond to an access point (AP). The receiving STA of FIG. 23 may correspond to an STA that supports an Extremely High Throughput (EHT) wireless LAN system.

The present embodiment proposes a method and an apparatus for setting a phase rotation value applied to a legacy preamble for an optimized PAPR of an L-STF and an L-LTF when a PPDU is transmitted over a broadband (240 MHz or 320 MHz band). However, the broadband according to the present embodiment refers to a full band for which preamble puncturing has not been performed, and the present embodiment is described based on an assumption that the broadband is limited to a 320 MHz band or a 160+160 MHz band.

In the S2310 step, a transmitting station (STA) generates a Physical Protocol Data Unit (PPDU).

In the S2320 step, the transmitting STA transmits the PPDU to a receiving STA through a broadband. The broadband is a 320 MHz band or a 160+160 MHz band for which preamble puncturing has not been performed.

The PPDU includes a first field and a second field. The first field includes a Legacy-Long Training Field (L-LTF). Also, the first field may further include a Legacy-Short Training Field (L-STF). The second field may include a control field and a data field that support the 802.11be wireless LAN system. In other words, the first field may be a legacy preamble, and the second field may be an EHT field.

The first field is generated based on one of a first, second, third, or fourth phase rotation values. One of the first, second, third, or fourth phase rotation values may be commonly applied to all fields included in the first field. The first, second, third, or fourth phase rotation values is defined as follows.

The first phase rotation value is a phase rotation value for obtaining the Peak-to-Average Power Ratio (PAPR) of the L-LTF optimized in the broadband based on a combination of a first Radio Frequency (RF) used when the PPDU is transmitted. The combination of the first RF is a combination of RF with 160 MHz capability or RF with 320 MHz capability. In other words, the first phase rotation value may be obtained i) in the full band for which preamble puncturing has not been performed ii) by considering 160 MHz/320 MHz capability RF iii) as a phase rotation value that minimizes the maximum PAPR of the L-LTF. Accordingly, the first phase rotation value is [1 j −1 j j 1 −j 1 1 j −1 j −j −1 j −1].

The second phase rotation value may be a phase rotation value for obtaining the PAPR of the L-STF optimized in the broadband based on a combination of the first RF. In other words, the second phase rotation value may be obtained i) in the full band for which preamble puncturing has not been performed ii) by considering 160 MHz/320 MHz capability RF iii) as a phase rotation value that minimizes the maximum PAPR of the L-STF. Accordingly, the second phase rotation value is [1 −1 −1 −1 −j −j j −j j −j j j 1 1 1 −1].

The third phase rotation value may be a phase rotation value for obtaining the PAPR of the L-LTF optimized in the broadband based on a combination of a second RF used when the PPDU is transmitted. The combination of the second RF is a combination of RF with 80 MHz capability, RF with 160 MHz capability, or RF with 320 MHz capability. In other words, the third phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the third phase rotation value is [1 j −1 j j 1 −j 1 1 j −1 j −j −1 j −1].

The fourth phase rotation value may be a phase rotation value for obtaining the PAPR of the L-STF optimized in the broadband based on a combination of the second RF. In other words, the fourth phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the fourth phase rotation value is [1 −1 −1 −1 −j −j j −j j −j j j 1 1 1 −1].

The first field may be generated by applying one of the first, second, third, or fourth phase rotation values in units of 20 MHz bands. In other words, one element of the first phase rotation value may be a phase rotation value applied to each 20 MHz band of the 320 MHz band or the 160+160 MHz band without preamble puncturing. One element of the second phase rotation value may be a phase rotation value applied to each 20 MHz band of the 320 MHz band or the 160+160 MHz band without preamble puncturing. One element of the third phase rotation value may be a phase rotation value applied to each 20 MHz band of the 320 MHz band or the 160+160 MHz band without preamble puncturing. One element of the fourth phase rotation value may be a phase rotation value applied to each 20 MHz band of the 320 MHz band or the 160+160 MHz band without preamble puncturing.

However, the combination of the second RF may not include a combination in which the RF with 160 MHz capability is used in the middle 160 MHz band and the RF with 80 MHz capability is used in both of the remaining 80 MHz bands, in the 320 MHz band or 160+160 MHz band without the preamble puncturing. In other words, the PPDU is not transmitted in a combination in which the RF with 160 MHz capability is used in the middle 160 MHz band in the 320 MHz band or the 160+160 MHz band, and the RF with 80 MHz capability is used in both of the remaining 80 MHz bands.

Specifically, a subcarrier range to which the phase rotation value is applied will be described.

The 320 MHz band or the 160+160 MHz band may consist of subcarriers of which the subcarrier index ranges from −512 to 511.

In one example, the first element 1 of the first phase rotation value is applied to subcarriers having a subcarrier index ranging from −512 to −449; the second element j of the first phase rotation value is applied to subcarriers having a subcarrier index ranging from −448 to −385; the third element −1 of the first phase rotation value is applied to subcarriers having a subcarrier index ranging from −384 to −321; and the fourth element j of the first phase rotation value is applied to subcarriers having a subcarrier index ranging from −320 to −257.

The fifth element j of the first phase rotation value is applied to subcarriers having a subcarrier index ranging from −256 to −193; the sixth element 1 of the first phase rotation value is applied to subcarriers having a subcarrier index ranging from −192 to −129; the seventh element −j of the first phase rotation value is applied to subcarriers having a subcarrier index ranging from −128 to −65; and the eighth element 1 of the first phase rotation value is applied to subcarriers having a subcarrier index ranging from −64 to −1.

The ninth element 1 of the first phase rotation value is applied to subcarriers having a subcarrier index ranging from 0 to 63; the tenth element j of the first phase rotation value is applied to subcarriers having a subcarrier index ranging from 64 to 127; the eleventh element −1 of the first phase rotation value is applied to subcarriers having a subcarrier index ranging from 128 to 191; and the twelfth element j of the first phase rotation value is applied to subcarriers having a subcarrier index ranging from 192 to 255.

The thirteenth element −j of the first phase rotation value is applied to subcarriers having a subcarrier index ranging from 256 to 319; the fourteenth element −1 of the first phase rotation value is applied to subcarriers having a subcarrier index ranging from 320 to 383; the fifteenth element j of the first phase rotation value is applied to subcarriers having a subcarrier index ranging from 384 to 447; and the sixteenth element 1 of the first phase rotation value is applied to subcarriers having a subcarrier index ranging from 448 to 511.

The first field may further include control information on the L-STF sequence and the L-LTF sequence. One of the first, second, third, or fourth phase rotation values may be applied to the L-STF sequence and the L-LTF sequence. The second field may include a control field and a data field supporting the 802.11be wireless LAN system.

In the embodiment above, when the PPDU is transmitted through the 240 MHz/160+80 MHz/80+160 MHz band, the phase rotation value may be defined for and applied to the first field (legacy preamble) in the same manner. However, the 240 MHz/160+80 MHz/80+160 MHz band may be determined as a band obtained by applying 80 MHz-based preamble puncturing to the 320 MHz/160+160 MHz band, and a phase rotation value obtained by unifying the phase rotation values defined for the 320 MHz/160+160 MHz band may be used without defining a separate phase rotation value for the 240 MHz/160+80 MHz/80+160 MHz band (unified technique). Alternatively, a phase rotation value optimized for the 240 MHz/160+80 MHz/80+160 MHz band (full band) may be obtained.

The control field of the second field may further include an EHT-SIG field that includes an EHT-SIG-A and EHT-SIG-B fields (or EHT-SIG-C field). The EHT-SIG-B field may include resource unit (RU) information. A transmitting STA may inform of information on the tone plan for 160/240/320 MHz through the EHT-SIG-B field in a PPDU. Also, the EHT-STF, EHT-LTF, and data fields included in the second field may be transmitted and received in a band (RU) according to a tone plan for 160/240/320 MHz.

Also, the EHT-SIG field may be generated by applying one of the first, second, third, or fourth phase rotation values. If the PPDU has the same preamble structure as in the 11 ax, fields may be generated by applying the same phase rotation value to those fields from the first field (legacy preamble) to the EHT-SIG-B field.

Figure 24:
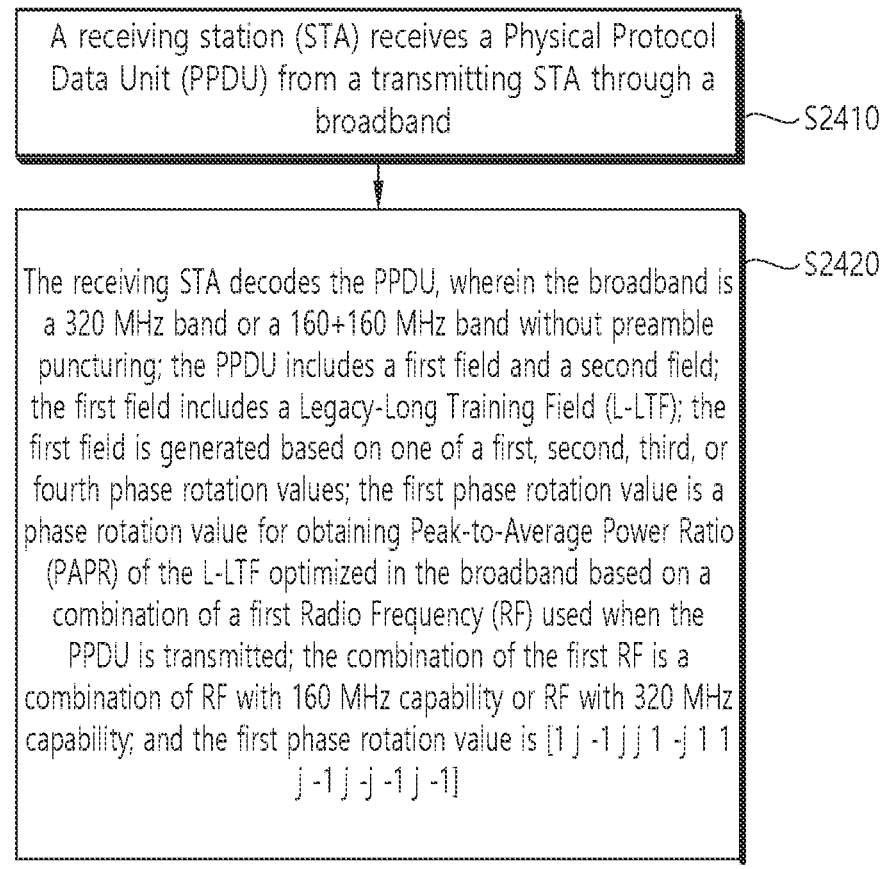
FIG. 24 is a flow diagram illustrating a procedure for a receiving STA to receive a PPDU according to the present embodiment.

FIG. 24 is a flow diagram illustrating a procedure for a receiving STA to receive a PPDU according to the present embodiment.

One example of FIG. 24 may be performed in a network supporting the next-generation wireless LAN system (the IEEE 802.11be or EHT wireless LAN system). The next-generation wireless LAN system is an improved version of the 802.11ax system and may satisfy backward compatibility with the 802.11ax system.

A receiving STA may perform one example of FIG. 24 and correspond to an STA that supports an Extremely High Throughput (EHT) wireless LAN system. A transmitting STA of FIG. 24 may correspond to an access point (AP).

The present embodiment proposes a method and an apparatus for setting a phase rotation value applied to a legacy preamble for an optimized PAPR of an L-STF and an L-LTF when a PPDU is transmitted over a broadband (240 MHz or 320 MHz band). However, the broadband according to the present embodiment refers to a full band for which preamble puncturing has not been performed, and the present embodiment is described based on an assumption that the broadband is limited to a 320 MHz band or a 160+160 MHz band.

In the S2410 step, a receiving STA receives a Physical Protocol Data Unit (PPDU) from a transmitting STA through a broadband.

In the S2420 step, the receiving STA decodes the PPDU.

The broadband is a 320 MHz band or a 160+160 MHz band for which preamble puncturing has not been performed.

The PPDU includes a first field and a second field. The first field includes a Legacy-Long Training Field (L-LTF). Also, the first field may further include a Legacy-Short Training Field (L-STF). The second field may include a control field and a data field that support the 802.11be wireless LAN system. In other words, the first field may be a legacy preamble, and the second field may be an EHT field.

The first field is generated based on one of a first, second, third, or fourth phase rotation values. One of the first, second, third, or fourth phase rotation values may be commonly applied to all fields included in the first field. The first, second, third, or fourth phase rotation values is defined as follows.

The first phase rotation value is a phase rotation value for obtaining the Peak-to-Average Power Ratio (PAPR) of the L-LTF optimized in the broadband based on a combination of a first Radio Frequency (RF) used when the PPDU is transmitted. The combination of the first RF is a combination of RF with 160 MHz capability or RF with 320 MHz capability. In other words, the first phase rotation value may be obtained i) in the full band for which preamble puncturing has not been performed ii) by considering 160 MHz/320 MHz capability RF iii) as a phase rotation value that minimizes the maximum PAPR of the L-LTF. Accordingly, the first phase rotation value is [1 j −1 j j 1 −j 1 1 j −1 j −j −1 j −1].

The second phase rotation value may be a phase rotation value for obtaining the PAPR of the L-STF optimized in the broadband based on a combination of the first RF. In other words, the second phase rotation value may be obtained i) in the full band for which preamble puncturing has not been performed ii) by considering 160 MHz/320 MHz capability RF iii) as a phase rotation value that minimizes the maximum PAPR of the L-STF. Accordingly, the second phase rotation value is [1 −1 −1 −1 −j −j j −j j −j j j 1 1 1 −1].

The third phase rotation value may be a phase rotation value for obtaining the PAPR of the L-LTF optimized in the broadband based on a combination of a second RF used when the PPDU is transmitted. The combination of the second RF is a combination of RF with 80 MHz capability, RF with 160 MHz capability, or RF with 320 MHz capability. In other words, the third phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the third phase rotation value is [1 j −1 j j 1 −j 1 1 j −1 j −j −1 j −1].

The fourth phase rotation value may be a phase rotation value for obtaining the PAPR of the L-STF optimized in the broadband based on a combination of the second RF. In other words, the fourth phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the fourth phase rotation value is [1 −1 −1 −1 −j −j j −j j −j j j 1 1 1 −1].

The first field may be generated by applying one of the first, second, third, or fourth phase rotation values in units of 20 MHz bands. In other words, one element of the first phase rotation value may be a phase rotation value applied to each 20 MHz band of the 320 MHz band or the 160+160 MHz band without preamble puncturing. One element of the second phase rotation value may be a phase rotation value applied to each 20 MHz band of the 320 MHz band or the 160+160 MHz band without preamble puncturing. One element of the third phase rotation value may be a phase rotation value applied to each 20 MHz band of the 320 MHz band or the 160+160 MHz band without preamble puncturing. One element of the fourth phase rotation value may be a phase rotation value applied to each 20 MHz band of the 320 MHz band or the 160+160 MHz band without preamble puncturing.

However, the combination of the second RF may not include a combination in which the RF with 160 MHz capability is used in the middle 160 MHz band and the RF with 80 MHz capability is used in both of the remaining 80 MHz bands, in the 320 MHz band or 160+160 MHz band without the preamble puncturing. In other words, the PPDU is not transmitted in a combination in which the RF with 160 MHz capability is used in the middle 160 MHz band in the 320 MHz band or the 160+160 MHz band, and the RF with 80 MHz capability is used in both of the remaining 80 MHz bands.

Specifically, a subcarrier range to which the phase rotation value is applied will be described.

The 320 MHz band or the 160+160 MHz band may consist of subcarriers of which the subcarrier index ranges from −512 to 511.

In one example, the first element 1 of the first phase rotation value is applied to subcarriers having a subcarrier index ranging from −512 to −449; the second element j of the first phase rotation value is applied to subcarriers having a subcarrier index ranging from −448 to −385; the third element −1 of the first phase rotation value is applied to subcarriers having a subcarrier index ranging from −384 to −321; and the fourth element j of the first phase rotation value is applied to subcarriers having a subcarrier index ranging from −320 to −257.

The fifth element j of the first phase rotation value is applied to subcarriers having a subcarrier index ranging from −256 to −193; the sixth element 1 of the first phase rotation value is applied to subcarriers having a subcarrier index ranging from −192 to −129; the seventh element −j of the first phase rotation value is applied to subcarriers having a subcarrier index ranging from −128 to −65; and the eighth element 1 of the first phase rotation value is applied to subcarriers having a subcarrier index ranging from −64 to −1.

The ninth element 1 of the first phase rotation value is applied to subcarriers having a subcarrier index ranging from 0 to 63; the tenth element j of the first phase rotation value is applied to subcarriers having a subcarrier index ranging from 64 to 127; the eleventh element −1 of the first phase rotation value is applied to subcarriers having a subcarrier index ranging from 128 to 191; and the twelfth element j of the first phase rotation value is applied to subcarriers having a subcarrier index ranging from 192 to 255.

The thirteenth element −j of the first phase rotation value is applied to subcarriers having a subcarrier index ranging from 256 to 319; the fourteenth element −1 of the first phase rotation value is applied to subcarriers having a subcarrier index ranging from 320 to 383; the fifteenth element j of the first phase rotation value is applied to subcarriers having a subcarrier index ranging from 384 to 447; and the sixteenth element 1 of the first phase rotation value is applied to subcarriers having a subcarrier index ranging from 448 to 511.

The first field may further include control information on the L-STF sequence and the L-LTF sequence. One of the first, second, third, or fourth phase rotation values may be applied to the L-STF sequence and the L-LTF sequence. The second field may include a control field and a data field supporting the 802.11be wireless LAN system.

In the embodiment above, when the PPDU is transmitted through the 240 MHz/160+80 MHz/80+160 MHz band, the phase rotation value may be defined for and applied to the first field (legacy preamble) in the same manner. However, the 240 MHz/160+80 MHz/80+160 MHz band may be determined as a band obtained by applying 80 MHz-based preamble puncturing to the 320 MHz/160+160 MHz band, and a phase rotation value obtained by unifying the phase rotation values defined for the 320 MHz/160+160 MHz band may be used without defining a separate phase rotation value for the 240 MHz/160+80 MHz/80+160 MHz band (unified technique). Alternatively, a phase rotation value optimized for the 240 MHz/160+80 MHz/80+160 MHz band (full band) may be obtained.

The control field of the second field may further include an EHT-SIG field that includes an EHT-SIG-A and EHT-SIG-B fields (or EHT-SIG-C field). The EHT-SIG-B field may include resource unit (RU) information. A transmitting STA may inform of information on the tone plan for 160/240/320 MHz through the EHT-SIG-B field in a PPDU. Also, the EHT-STF, EHT-LTF, and data fields included in the second field may be transmitted and received in a band (RU) according to a tone plan for 160/240/320 MHz.

Also, the EHT-SIG field may be generated by applying one of the first, second, third, or fourth phase rotation values. If the PPDU has the same preamble structure as in the 11ax, fields may be generated by applying the same phase rotation value to those fields from the first field (legacy preamble) to the EHT-SIG-B field.

5. Device Configuration

Figure 25:
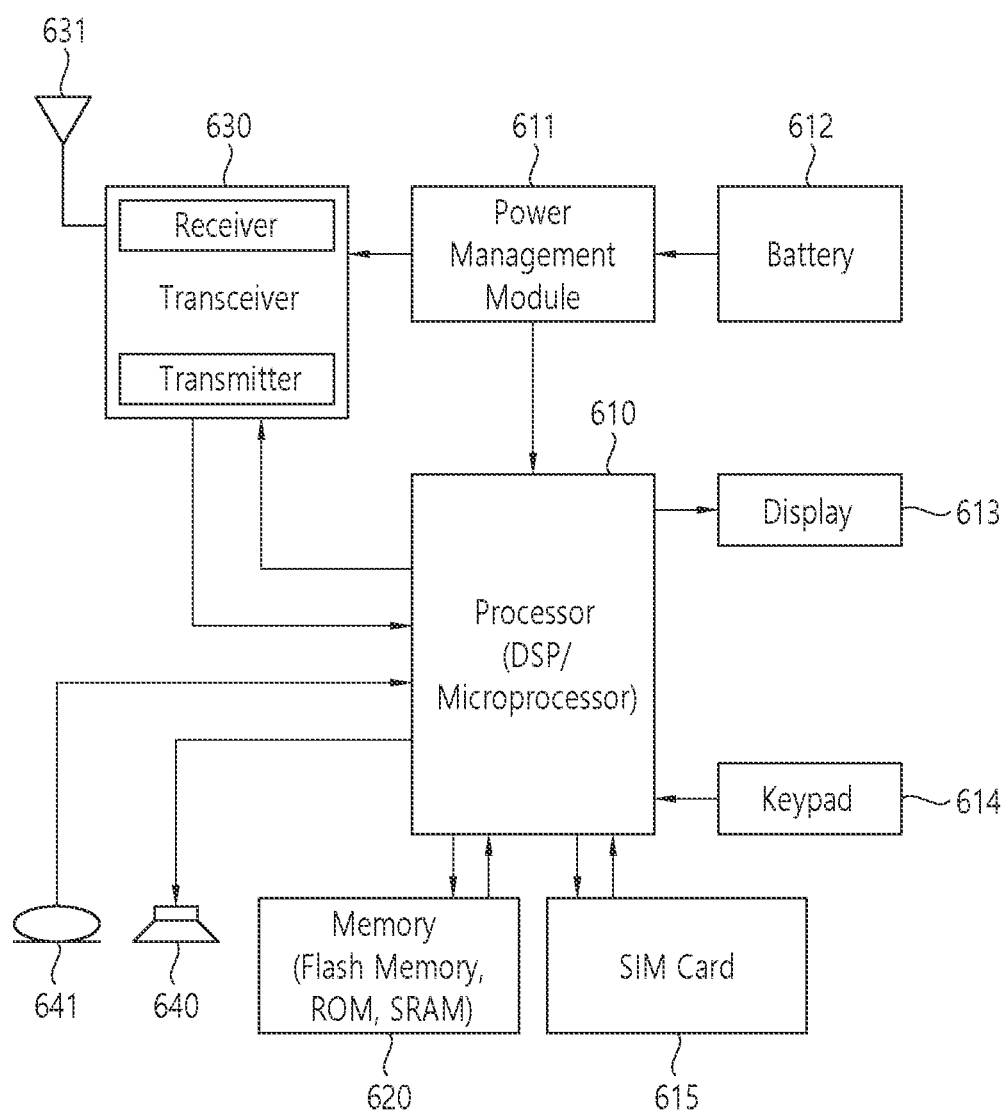
FIG. 25 illustrates an example of a modified transmitting device and/or receiving device of the present specification.

FIG. 25 illustrates an example of a modified transmitting device and/or receiving device of the present specification.

Each device/STA shown in sub-figures (a)/(b) of FIG. 1 may be modified as shown in FIG. 25. A transceiver 630 of FIG. 25 may be the same as the transceiver(s) 113 and 123 of FIG. 1. The transceiver 630 of FIG. 25 may include a receiver and a transmitter.

A processor 610 of FIG. 25 may be the same as the processor(s) 111 and 121 shown in FIG. 1. Alternatively, the processor 610 of FIG. 25 may be the same as the processing chip(s) 114 and 124 shown in FIG. 1.

A memory 150 of FIG. 25 may be the same as the memory(s) 112 and 122 shown in FIG. 1. Alternatively, the memory 150 of FIG. 25 may be a separate external memory that is different from the memory(s) 112 and 122 shown in FIG. 1.

Referring to FIG. 25, the power management module 611 manages power for the processor 610 and/or the transceiver 630. The battery 612 supplies power to the power management module 611. The display 613 outputs results processed by the processor 610. The keypad 614 receives inputs that are to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices, such as mobile phones and computers.

Referring to FIG. 25, the speaker 640 may output sound-related results processed by the processor 610. The microphone 641 may receive sound-related inputs to be used by the processor 610.

The above-described technical features of the present specification may be applied to various devices and methods. For example, the above-described technical features of the present specification may be performed/supported through the device(s) of FIG. 1 and/or FIG. 25. For example, the above-described technical features of the present specification may be applied to only part of FIG. 1 and/or FIG. 25. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 25. For example, the device according to the present specification receives a Physical Protocol Data Unit (PPDU) from a transmitting station (STA) through a wideband, and decodes the PPDU.

The broadband is a 320 MHz band or a 160+160 MHz band without preamble puncturing.

The PPDU includes a first field and a second field. The first field includes a Legacy-Long Training Field (L-LTF). Also, the first field may further include a Legacy-Short Training Field (L-STF). The second field may include a control field and a data field that support the 802.11be wireless LAN system. In other words, the first field may be a legacy preamble, and the second field may be an EHT field.

The first field is generated based on one of a first, second, third, or fourth phase rotation values. One of the first, second, third, or fourth phase rotation values may be commonly applied to all fields included in the first field. The first, second, third, or fourth phase rotation values is defined as follows.

The first phase rotation value is a phase rotation value for obtaining the Peak-to-Average Power Ratio (PAPR) of the L-LTF optimized in the broadband based on a combination of a first Radio Frequency (RF) used when the PPDU is transmitted. The combination of the first RF is a combination of RF with 160 MHz capability or RF with 320 MHz capability. In other words, the first phase rotation value may be obtained i) in the full band for which preamble puncturing has not been performed ii) by considering 160 MHz/320 MHz capability RF iii) as a phase rotation value that minimizes the maximum PAPR of the L-LTF. Accordingly, the first phase rotation value is [1 j −1 j j 1 −j 1 1 j −1 j −j −1 j −1].

The second phase rotation value may be a phase rotation value for obtaining the PAPR of the L-STF optimized in the broadband based on a combination of the first RF. In other words, the second phase rotation value may be obtained i) in the full band for which preamble puncturing has not been performed ii) by considering 160 MHz/320 MHz capability RF iii) as a phase rotation value that minimizes the maximum PAPR of the L-STF. Accordingly, the second phase rotation value is [1 −1 −1 −1 −j −j j −j j −j j j 1 1 1 −1].

The third phase rotation value may be a phase rotation value for obtaining the PAPR of the L-LTF optimized in the broadband based on a combination of a second RF used when the PPDU is transmitted. The combination of the second RF is a combination of RF with 80 MHz capability, RF with 160 MHz capability, or RF with 320 MHz capability. In other words, the third phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the third phase rotation value is [1 j −1 j j 1 −j 1 1 j −1 j −j −1 j −1].

The fourth phase rotation value may be a phase rotation value for obtaining the PAPR of the L-STF optimized in the broadband based on a combination of the second RF. In other words, the fourth phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the fourth phase rotation value is [1 −1 −1 −1 −j −j j −j j −j j j 1 1 1 −1].

The first field may be generated by applying one of the first, second, third, or fourth phase rotation values in units of 20 MHz bands. In other words, one element of the first phase rotation value may be a phase rotation value applied to each 20 MHz band of the 320 MHz band or the 160+160 MHz band without preamble puncturing. One element of the second phase rotation value may be a phase rotation value applied to each 20 MHz band of the 320 MHz band or the 160+160 MHz band without preamble puncturing. One element of the third phase rotation value may be a phase rotation value applied to each 20 MHz band of the 320 MHz band or the 160+160 MHz band without preamble puncturing. One element of the fourth phase rotation value may be a phase rotation value applied to each 20 MHz band of the 320 MHz band or the 160+160 MHz band without preamble puncturing.

However, the combination of the second RF may not include a combination in which the RF with 160 MHz capability is used in the middle 160 MHz band and the RF with 80 MHz capability is used in both of the remaining 80 MHz bands, in the 320 MHz band or 160+160 MHz band without the preamble puncturing. In other words, the PPDU is not transmitted in a combination in which the RF with 160 MHz capability is used in the middle 160 MHz band in the 320 MHz band or the 160+160 MHz band, and the RF with 80 MHz capability is used in both of the remaining 80 MHz bands.

Specifically, a subcarrier range to which the phase rotation value is applied will be described.

The 320 MHz band or the 160+160 MHz band may consist of subcarriers of which the subcarrier index ranges from −512 to 511.

In one example, the first element 1 of the first phase rotation value is applied to subcarriers having a subcarrier index ranging from −512 to −449; the second element j of the first phase rotation value is applied to subcarriers having a subcarrier index ranging from −448 to −385; the third element −1 of the first phase rotation value is applied to subcarriers having a subcarrier index ranging from −384 to −321; and the fourth element j of the first phase rotation value is applied to subcarriers having a subcarrier index ranging from −320 to −257.

The fifth element j of the first phase rotation value is applied to subcarriers having a subcarrier index ranging from −256 to −193; the sixth element 1 of the first phase rotation value is applied to subcarriers having a subcarrier index ranging from −192 to −129; the seventh element −j of the first phase rotation value is applied to subcarriers having a subcarrier index ranging from −128 to −65; and the eighth element 1 of the first phase rotation value is applied to subcarriers having a subcarrier index ranging from −64 to −1.

The ninth element 1 of the first phase rotation value is applied to subcarriers having a subcarrier index ranging from 0 to 63; the tenth element j of the first phase rotation value is applied to subcarriers having a subcarrier index ranging from 64 to 127; the eleventh element −1 of the first phase rotation value is applied to subcarriers having a subcarrier index ranging from 128 to 191; and the twelfth element j of the first phase rotation value is applied to subcarriers having a subcarrier index ranging from 192 to 255.

The thirteenth element −j of the first phase rotation value is applied to subcarriers having a subcarrier index ranging from 256 to 319; the fourteenth element −1 of the first phase rotation value is applied to subcarriers having a subcarrier index ranging from 320 to 383; the fifteenth element j of the first phase rotation value is applied to subcarriers having a subcarrier index ranging from 384 to 447; and the sixteenth element 1 of the first phase rotation value is applied to subcarriers having a subcarrier index ranging from 448 to 511.

The first field may further include control information on the L-STF sequence and the L-LTF sequence. One of the first, second, third, or fourth phase rotation values may be applied to the L-STF sequence and the L-LTF sequence. The second field may include a control field and a data field supporting the 802.11be wireless LAN system.

In the embodiment above, when the PPDU is transmitted through the 240 MHz/160+80 MHz/80+160 MHz band, the phase rotation value may be defined for and applied to the first field (legacy preamble) in the same manner. However, the 240 MHz/160+80 MHz/80+160 MHz band may be determined as a band obtained by applying 80 MHz-based preamble puncturing to the 320 MHz/160+160 MHz band, and a phase rotation value obtained by unifying the phase rotation values defined for the 320 MHz/160+160 MHz band may be used without defining a separate phase rotation value for the 240 MHz/160+80 MHz/80+160 MHz band (unified technique). Alternatively, a phase rotation value optimized for the 240 MHz/160+80 MHz/80+160 MHz band (full band) may be obtained.

The control field of the second field may further include an EHT-SIG field that includes an EHT-SIG-A and EHT-SIG-B fields (or EHT-SIG-C field). The EHT-SIG-B field may include resource unit (RU) information. A transmitting STA may inform of information on the tone plan for 160/240/320 MHz through the EHT-SIG-B field in a PPDU. Also, the EHT-STF, EHT-LTF, and data fields included in the second field may be transmitted and received in a band (RU) according to a tone plan for 160/240/320 MHz.

Also, the EHT-SIG field may be generated by applying one of the first, second, third, or fourth phase rotation values. If the PPDU has the same preamble structure as in the 11 ax, fields may be generated by applying the same phase rotation value to those fields from the first field (legacy preamble) to the EHT-SIG-B field.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a Physical Protocol Data Unit (PPDU) from a transmitting STA through a broadband and decoding the PPDU. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 25. Meanwhile, the CRM of the present disclosure may be the memory 112, 122 of FIG. 1, the memory 620 of FIG. 25, or a separate external memory/storage medium/disk.

The broadband is a 320 MHz band or a 160+160 MHz band without preamble puncturing.

The PPDU includes a first field and a second field. The first field includes a Legacy-Long Training Field (L-LTF). Also, the first field may further include a Legacy-Short Training Field (L-STF). The second field may include a control field and a data field that support the 802.11be wireless LAN system. In other words, the first field may be a legacy preamble, and the second field may be an EHT field.

The first field is generated based on one of a first, second, third, or fourth phase rotation values. One of the first, second, third, or fourth phase rotation values may be commonly applied to all fields included in the first field. The first, second, third, or fourth phase rotation values is defined as follows.

The first phase rotation value is a phase rotation value for obtaining the Peak-to-Average Power Ratio (PAPR) of the L-LTF optimized in the broadband based on a combination of a first Radio Frequency (RF) used when the PPDU is transmitted. The combination of the first RF is a combination of RF with 160 MHz capability or RF with 320 MHz capability. In other words, the first phase rotation value may be obtained i) in the full band for which preamble puncturing has not been performed ii) by considering 160 MHz/320 MHz capability RF iii) as a phase rotation value that minimizes the maximum PAPR of the L-LTF. Accordingly, the first phase rotation value is [1 j −1 j j 1 −j 1 1 j −1 j −j −1 j −1].

The second phase rotation value may be a phase rotation value for obtaining the PAPR of the L-STF optimized in the broadband based on a combination of the first RF. In other words, the second phase rotation value may be obtained i) in the full band for which preamble puncturing has not been performed ii) by considering 160 MHz/320 MHz capability RF iii) as a phase rotation value that minimizes the maximum PAPR of the L-STF. Accordingly, the first phase rotation value is [1 −1 −1 −1 −j −j j −j j −j j j 1 1 1 −1].

The third phase rotation value may be a phase rotation value for obtaining the PAPR of the L-LTF optimized in the broadband based on a combination of a second RF used when the PPDU is transmitted. The combination of the second RF is a combination of RF with 80 MHz capability, RF with 160 MHz capability, or RF with 320 MHz capability. In other words, the third phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the third phase rotation value is [1 j −1 j j 1 −j 1 1 j −1 j −j −1 j −1].

The fourth phase rotation value may be a phase rotation value for obtaining the PAPR of the L-STF optimized in the broadband based on a combination of the second RF. In other words, the fourth phase rotation value may be obtained i) in the full band for which preamble puncturing has not been performed ii) by considering 80 MHz/160 MHz/320 MHz capability RF iii) as a phase rotation value that minimizes the maximum PAPR of the L-LTF. Accordingly, the fourth phase rotation value is [1 −1 −1 −1 −j −j j −j j −j j j 1 1 1 −1].

The first field may be generated by applying one of the first, second, third, or fourth phase rotation values in units of 20 MHz bands. In other words, one element of the first phase rotation value may be a phase rotation value applied to each 20 MHz band of the 320 MHz band or the 160+160 MHz band without preamble puncturing. One element of the second phase rotation value may be a phase rotation value applied to each 20 MHz band of the 320 MHz band or the 160+160 MHz band without preamble puncturing. One element of the third phase rotation value may be a phase rotation value applied to each 20 MHz band of the 320 MHz band or the 160+160 MHz band without preamble puncturing. One element of the fourth phase rotation value may be a phase rotation value applied to each 20 MHz band of the 320 MHz band or the 160+160 MHz band without preamble puncturing.

However, the combination of the second RF may not include a combination in which the RF with 160 MHz capability is used in the middle 160 MHz band and the RF with 80 MHz capability is used in both of the remaining 80 MHz bands, in the 320 MHz band or 160+160 MHz band without the preamble puncturing. In other words, the PPDU is not transmitted in a combination in which the RF with 160 MHz capability is used in the middle 160 MHz band in the 320 MHz band or the 160+160 MHz band, and the RF with 80 MHz capability is used in both of the remaining 80 MHz bands.

Specifically, a subcarrier range to which the phase rotation value is applied will be described.

The 320 MHz band or the 160+160 MHz band may consist of subcarriers of which the subcarrier index ranges from −512 to 511.

In one example, the first element 1 of the first phase rotation value is applied to subcarriers having a subcarrier index ranging from −512 to −449; the second element j of the first phase rotation value is applied to subcarriers having a subcarrier index ranging from −448 to −385; the third element −1 of the first phase rotation value is applied to subcarriers having a subcarrier index ranging from −384 to −321; and the fourth element j of the first phase rotation value is applied to subcarriers having a subcarrier index ranging from −320 to −257.

The fifth element j of the first phase rotation value is applied to subcarriers having a subcarrier index ranging from −256 to −193; the sixth element 1 of the first phase rotation value is applied to subcarriers having a subcarrier index ranging from −192 to −129; the seventh element −j of the first phase rotation value is applied to subcarriers having a subcarrier index ranging from −128 to −65; and the eighth element 1 of the first phase rotation value is applied to subcarriers having a subcarrier index ranging from −64 to −1.

The ninth element 1 of the first phase rotation value is applied to subcarriers having a subcarrier index ranging from 0 to 63; the tenth element j of the first phase rotation value is applied to subcarriers having a subcarrier index ranging from 64 to 127; the eleventh element −1 of the first phase rotation value is applied to subcarriers having a subcarrier index ranging from 128 to 191; and the twelfth element j of the first phase rotation value is applied to subcarriers having a subcarrier index ranging from 192 to 255.

The thirteenth element −j of the first phase rotation value is applied to subcarriers having a subcarrier index ranging from 256 to 319; the fourteenth element −1 of the first phase rotation value is applied to subcarriers having a subcarrier index ranging from 320 to 383; the fifteenth element j of the first phase rotation value is applied to subcarriers having a subcarrier index ranging from 384 to 447; and the sixteenth element 1 of the first phase rotation value is applied to subcarriers having a subcarrier index ranging from 448 to 511.

The first field may further include control information on the L-STF sequence and the L-LTF sequence. One of the first, second, third, or fourth phase rotation values may be applied to the L-STF sequence and the L-LTF sequence. The second field may include a control field and a data field supporting the 802.11be wireless LAN system.

In the embodiment above, when the PPDU is transmitted through the 240 MHz/160+80 MHz/80+160 MHz band, the phase rotation value may be defined for and applied to the first field (legacy preamble) in the same manner. However, the 240 MHz/160+80 MHz/80+160 MHz band may be determined as a band obtained by applying 80 MHz-based preamble puncturing to the 320 MHz/160+160 MHz band, and a phase rotation value obtained by unifying the phase rotation values defined for the 320 MHz/160+160 MHz band may be used without defining a separate phase rotation value for the 240 MHz/160+80 MHz/80+160 MHz band (unified technique). Alternatively, a phase rotation value optimized for the 240 MHz/160+80 MHz/80+160 MHz band (full band) may be obtained.

The control field of the second field may further include an EHT-SIG field that includes an EHT-SIG-A and EHT-SIG-B fields (or EHT-SIG-C field). The EHT-SIG-B field may include resource unit (RU) information. A transmitting STA may inform of information on the tone plan for 160/240/320 MHz through the EHT-SIG-B field in a PPDU. Also, the EHT-STF, EHT-LTF, and data fields included in the second field may be transmitted and received in a band (RU) according to a tone plan for 160/240/320 MHz.

Also, the EHT-SIG field may be generated by applying one of the first, second, third, or fourth phase rotation values. If the PPDU has the same preamble structure as in the 11 ax, fields may be generated by applying the same phase rotation value to those fields from the first field (legacy preamble) to the EHT-SIG-B field.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless LAN system, the method comprising:
    receiving a Physical Protocol Data Unit (PPDU) by a receiving station (STA) from a transmitting STA through a broadband; and
    decoding the PPDU by the receiving STA,
    wherein the broadband is a 320 MHz band or a 160+160 MHz band without preamble puncturing,
    the PPDU includes a first field and a second field,
    the first field includes a Legacy-Long Training Field (L-LTF),
    the first field is generated based on one of a first, second, third, or fourth phase rotation values,
    the first phase rotation value is a phase rotation value for obtaining Peak-to-Average Power Ratio (PAPR) of the L-LTF optimized in the broadband based on a combination of a first Radio Frequency (RF) used when the PPDU is transmitted,
    the combination of the first RF is a combination of RF with 160 MHz capability or RF with 320 MHz capability, and
    the first phase rotation value is [1 j −1 j j 1 −j 1 1 j −1 j −j −1 j −1].

2. The method of claim 1, wherein the first field further includes a Legacy-Short Training Field (L-STF),
    the second phase rotation value is a phase rotation value for obtaining the PAPR of the L-STF optimized in the broadband based on a combination of the first RF, and
    the second phase rotation value is [1 −1 −1 −1 −j −j j −j j −j j j 1 1 1 −1].

3. The method of claim 2, wherein one element of the first phase rotation value is a phase rotation value applied to each 20 MHz band of the 320 MHz band or the 160+160 MHz band without preamble puncturing, and
    one element of the second phase rotation value is a phase rotation value applied to each 20 MHz band of the 320 MHz band or the 160+160 MHz band without preamble puncturing.

4. The method of claim 1, wherein the third phase rotation value is a phase rotation value for obtaining the PAPR of the L-LTF optimized in the broadband based on a combination of a second RF used when the PPDU is transmitted,
    the combination of the second RF is a combination of RF with 80 MHz capability, RF with 160 MHz capability, or RF with 320 MHz capability, and
    the third phase rotation value is [1 j −1 j j 1 −j 1 1 j −1 j −j −1 j −1].

5. The method of claim 4, wherein the first field further includes an L-STF,
    the fourth phase rotation value is a phase rotation value for obtaining the PAPR of the L-STF optimized in the broadband based on a combination of the second RF, and
    the fourth phase rotation value is [1 −1 −1 −1 −j −j j −j j −j j j 1 1 1 −1].

6. The method of claim 5, wherein one element of the third phase rotation value is a phase rotation value applied to each 20 MHz band of the 320 MHz band or the 160+160 MHz band without preamble puncturing, and
    one element of the fourth phase rotation value is a phase rotation value applied to each 20 MHz band of the 320 MHz band or the 160+160 MHz band without preamble puncturing.

7. The method of claim 5, wherein the combination of the second RF does not include a combination in which the RF with 160 MHz capability is used in the middle 160 MHz band and the RF with 80 MHz capability is used in both of the remaining 80 MHz bands, in the 320 MHz band or 160+160 MHz band without the preamble puncturing.

8. The method of claim 2, wherein the first field further includes control information on the L-STF sequence and the L-LTF sequence,
    one of the first, second, third, or fourth phase rotation values is applied to the L-STF sequence and the L-LTF sequence, and
    the second field includes a control field and a data field supporting the 802.11be wireless LAN system.

9. A receiving station (STA) in a wireless LAN system, the receiving STA comprising:
    a memory;
    a transceiver; and
    a processor combined operatively with the memory and the transceiver, wherein the processor is configured to:
    receive a Physical Protocol Data Unit (PPDU) from a transmitting STA through a broadband; and
    decode the PPDU,
    wherein the broadband is a 320 MHz band or a 160+160 MHz band without preamble puncturing,
    the PPDU includes a first field and a second field,
    the first field includes a Legacy-Long Training Field (L-LTF),
    the first field is generated based on one of a first, second, third, or fourth phase rotation values,
    the first phase rotation value is a phase rotation value for obtaining Peak-to-Average Power Ratio (PAPR) of the L-LTF optimized in the broadband based on a combination of a first Radio Frequency (RF) used when the PPDU is transmitted,
    the combination of the first RF is a combination of RF with 160 MHz capability or RF with 320 MHz capability, and
    the first phase rotation value is [1 j −1 j j 1 −j 1 1 j −1 j −j −1 j −1].

10. A method in a wireless LAN system, the method comprising:
    generating a Physical Protocol Data Unit (PPDU) by a transmitting station (STA); and
    transmitting the PPDU to a receiving STA through a broadband by the transmitting STA,
    wherein the broadband is a 320 MHz band or a 160+160 MHz band without preamble puncturing,
    the PPDU includes a first field and a second field,
    the first field includes a Legacy-Long Training Field (L-LTF),
    the first field is generated based on one of a first, second, third, or fourth phase rotation values,
    the first phase rotation value is a phase rotation value for obtaining Peak-to-Average Power Ratio (PAPR) of the L-LTF optimized in the broadband based on a combination of a first Radio Frequency (RF) used when the PPDU is transmitted,
    the combination of the first RF is a combination of RF with 160 MHz capability or RF with 320 MHz capability, and
    the first phase rotation value is [1 j −1 j j 1 −j 1 1 j −1 j −j −1 j −1].

11. The method of claim 10, wherein the first field further includes a Legacy-Short Training Field (L-STF), the second phase rotation value is a phase rotation value for obtaining the PAPR of the L-STF optimized in the broadband based on a combination of the first RF, and the second phase rotation value is [1 −1 −1 −1 −j −j j −j j −j j j 1 1 1 −1].

12. The method of claim 11, wherein one element of the first phase rotation value is a phase rotation value applied to each 20 MHz band of the 320 MHz band or the 160+160 MHz band without preamble puncturing, and one element of the second phase rotation value is a phase rotation value applied to each 20 MHz band of the 320 MHz band or the 160+160 MHz band without preamble puncturing.

13. The method of claim 10, wherein the third phase rotation value is a phase rotation value for obtaining the PAPR of the L-LTF optimized in the broadband based on a combination of a second RF used when the PPDU is transmitted, the combination of the second RF is a combination of RF with 80 MHz capability, RF with 160 MHz capability, or RF with 320 MHz capability, and the third phase rotation value is [1 j −1 j j 1 −j 1 1 j −1 j −j −1 j −1].

14. The method of claim 13, wherein the first field further includes an L-STF, the fourth phase rotation value is a phase rotation value for obtaining the PAPR of the L-STF optimized in the broadband based on a combination of the second RF, and the fourth phase rotation value is [1 −1 −1 −1 −j −j j −j j −j j j 1 1 1 −1].

15. The method of claim 14, wherein one element of the third phase rotation value is a phase rotation value applied to each 20 MHz band of the 320 MHz band or the 160+160 MHz band without preamble puncturing, and one element of the fourth phase rotation value is a phase rotation value applied to each 20 MHz band of the 320 MHz band or the 160+160 MHz band without preamble puncturing.

16. The method of claim 13, wherein the combination of the second RF does not include a combination in which the RF with 160 MHz capability is used in the middle 160 MHz band and the RF with 80 MHz capability is used in both of the remaining 80 MHz bands, in the 320 MHz band or 160+160 MHz band without the preamble puncturing.

17. The method of claim 11, wherein the first field further includes control information on the L-STF sequence and the L-LTF sequence, one of the first, second, third, or fourth phase rotation values is applied to the L-STF sequence and the L-LTF sequence, and the second field includes a control field and a data field supporting the 802.11be wireless LAN system.

* * * * *